(12) United States Patent
Rofougaran

(10) Patent No.: US 7,894,830 B2
(45) Date of Patent: Feb. 22, 2011

(54) MOTION ADAPTIVE WIRELESS LOCAL AREA NETWORK, WIRELESS COMMUNICATIONS DEVICE AND INTEGRATED CIRCUITS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 723 days.

(21) Appl. No.: 11/796,647

(22) Filed: Apr. 28, 2007

(65) Prior Publication Data

US 2008/0267150 A1   Oct. 30, 2008

(51) Int. Cl.
*H04W 24/00* (2009.01)

(52) U.S. Cl. .................... 455/456.5; 455/456.6

(58) Field of Classification Search ............ 342/357.14; 455/556.1, 456.5, 456.6, 403, 404.1, 404.2, 455/414.2

See application file for complete search history.

(56) References Cited

U.S. PATENT DOCUMENTS

| | | | | |
|---|---|---|---|---|
| 5,555,503 | A * | 9/1996 | Kyrtsos et al. ............. | 701/207 |
| 5,644,317 | A * | 7/1997 | Weston et al. ........... | 342/357.14 |
| 6,141,565 | A * | 10/2000 | Feuerstein et al. .......... | 455/560 |
| 6,580,905 | B1 * | 6/2003 | Naidu et al. .............. | 455/522 |
| 6,615,135 | B2 * | 9/2003 | Davies ....................... | 701/213 |
| 6,788,248 | B2 * | 9/2004 | Lee ....................... | 342/357.02 |
| 6,799,050 | B1 * | 9/2004 | Krasner ................... | 455/456.1 |
| 6,845,246 | B1 * | 1/2005 | Steer ......................... | 455/522 |
| 6,944,141 | B1 * | 9/2005 | Yen ............................ | 370/330 |
| 7,260,415 | B1 * | 8/2007 | Oh ............................. | 455/522 |
| 7,349,503 | B2 * | 3/2008 | Husted et al. .............. | 375/346 |
| 7,353,001 | B1 * | 4/2008 | Ngan ......................... | 455/63.4 |
| 7,477,187 | B2 * | 1/2009 | Rofougaran ........... | 342/357.14 |
| 7,477,188 | B2 * | 1/2009 | Rofougaran ........... | 342/357.14 |
| 7,551,928 | B2 * | 6/2009 | Nielsen et al. ............ | 455/456.1 |
| 7,552,636 | B2 * | 6/2009 | Datskos ................... | 73/504.04 |

(Continued)

FOREIGN PATENT DOCUMENTS

GB   2397974 A   *   8/2004

OTHER PUBLICATIONS

Kranz, M.; Burgett, S.; Hudson, T.; Buncick, M.; Ruffin, P.; Ashley, P.; McKee, J.; Morgan Res. Corp., Huntsville, AL, USA, "A wide dynamic range Silicon-on-Insulator MEMS gyroscope with digital force feedback", Transducers, Solid-State Sensors, Actuators and Microsystems, 12th International Conference on, vol. 1, pp. 159-162, Jun. 2003.*

*Primary Examiner*—Kent Chang
*Assistant Examiner*—Ronald Eisner
(74) *Attorney, Agent, or Firm*—Garlick Harrison & Markison; Bruce E. Stuckman

(57) ABSTRACT

A circuit includes an on-chip gyrating circuit that generates a motion parameter based on motion of the circuit. A global positioning system (GPS) receiver receives a GPS signal and that generates GPS position data based on the GPS signal. A processing module processes the motion parameter to produce motion data, generates position information based on at least one of the GPS position data and the motion data, converts outbound data into an outbound symbol stream, and converts an inbound symbol stream into inbound data. A wireless local area network (WLAN) transceiver section generates an outbound RF signal from the outbound symbol stream, and converts an inbound RF signal into the inbound symbol stream.

25 Claims, 18 Drawing Sheets

U.S. PATENT DOCUMENTS

| | | | |
|---|---|---|---|
| 7,592,954 B2 * | 9/2009 | Rofougaran | 342/357.14 |
| 2003/0236089 A1 * | 12/2003 | Beyme et al. | 455/423 |
| 2004/0017310 A1 * | 1/2004 | Vargas-Hurlston et al. | 342/357.1 |
| 2005/0110778 A1 * | 5/2005 | Ben Ayed | 345/179 |
| 2006/0094449 A1 | 5/2006 | Goldberg | |
| 2006/0187418 A1 * | 8/2006 | Akiyama | 353/33 |
| 2006/0205356 A1 * | 9/2006 | Laroia et al. | 455/66.1 |
| 2007/0001898 A1 * | 1/2007 | Twitchell et al. | 342/357.02 |
| 2007/0032950 A1 * | 2/2007 | O'Flanagan et al. | 701/214 |
| 2007/0087770 A1 * | 4/2007 | Gan | 455/522 |
| 2008/0160922 A1 * | 7/2008 | Sun et al. | 455/67.14 |
| 2008/0191867 A1 * | 8/2008 | Markovich | 340/539.13 |
| 2008/0238770 A1 * | 10/2008 | Rofougaran | 342/357.14 |
| 2008/0242349 A1 * | 10/2008 | Rofougaran | 455/556.1 |
| 2008/0268872 A1 * | 10/2008 | Rofougaran | 455/456.6 |
| 2008/0318626 A1 * | 12/2008 | Rofougaran | 455/556.1 |
| 2009/0079628 A1 * | 3/2009 | Rofougaran | 342/357.14 |
| 2009/0079629 A1 * | 3/2009 | Rofougaran | 342/357.14 |
| 2009/0190684 A1 * | 7/2009 | She et al. | 375/267 |
| 2009/0233591 A1 * | 9/2009 | Zhu et al. | 455/418 |
| 2010/0022262 A1 * | 1/2010 | Aue | 455/501 |

* cited by examiner

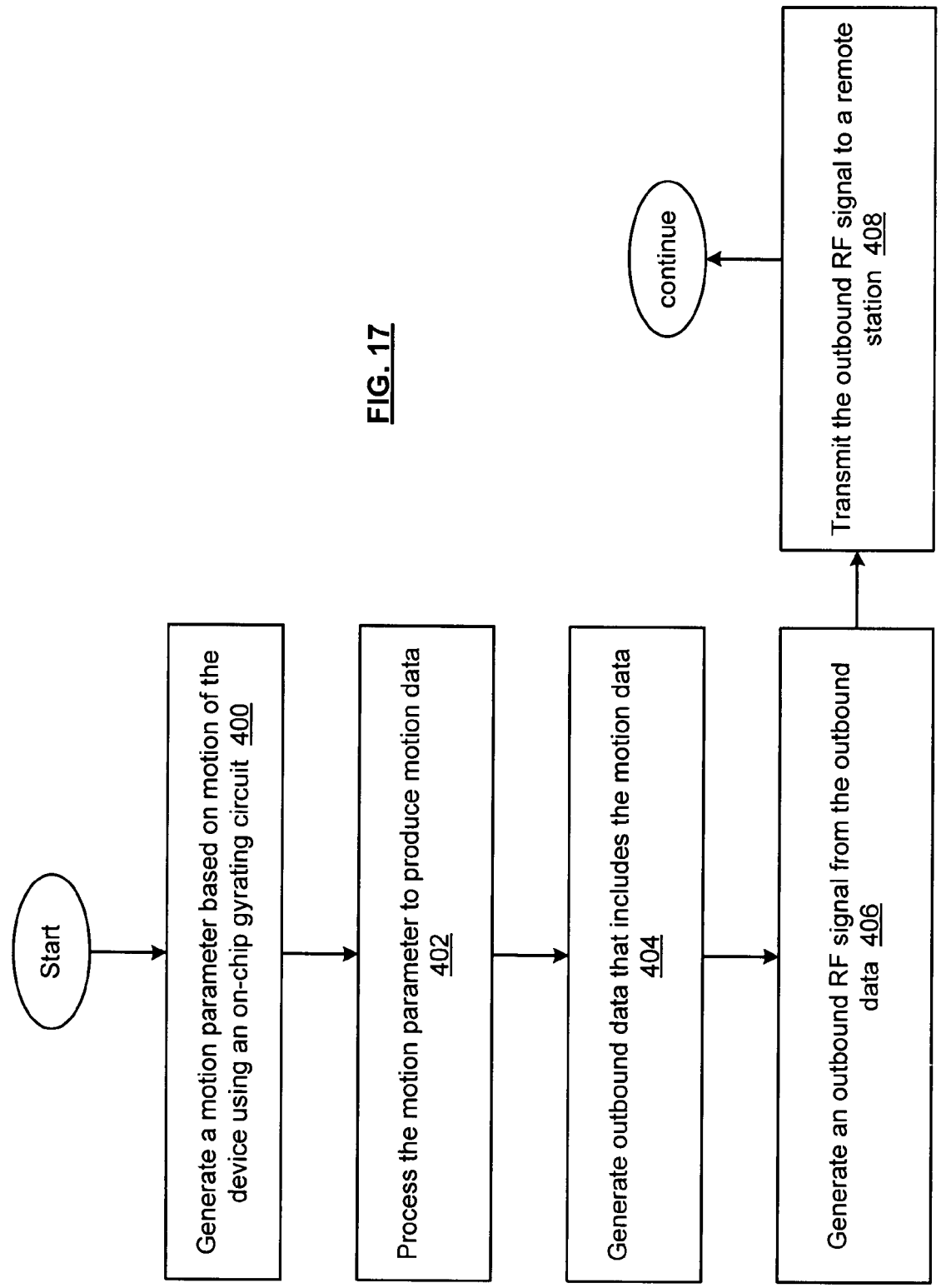

MOTION ADAPTIVE WIRELESS LOCAL AREA NETWORK, WIRELESS COMMUNICATIONS DEVICE AND INTEGRATED CIRCUITS FOR USE THEREWITH

CROSS-REFERENCE TO RELATED APPLICATIONS

Not applicable

BACKGROUND OF THE INVENTION

1. Technical Field of the Invention

This invention relates generally to mobile communication devices, GPS receivers and more particularly to RF integrated circuit for use therein.

2. Description of the Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As is also known, hand held global positioning system (GPS) receivers are becoming popular. In general, GPS receivers include receiver-processors, and a highly-stable clock, and an antenna that is tuned to the frequencies transmitted by the satellites. The receiver may also include a display for providing location and speed information to the user. Many GPS receivers can relay position data to a PC or other device using a US-based National Marine Electronics Association (NMEA) protocol.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

Figure 3:
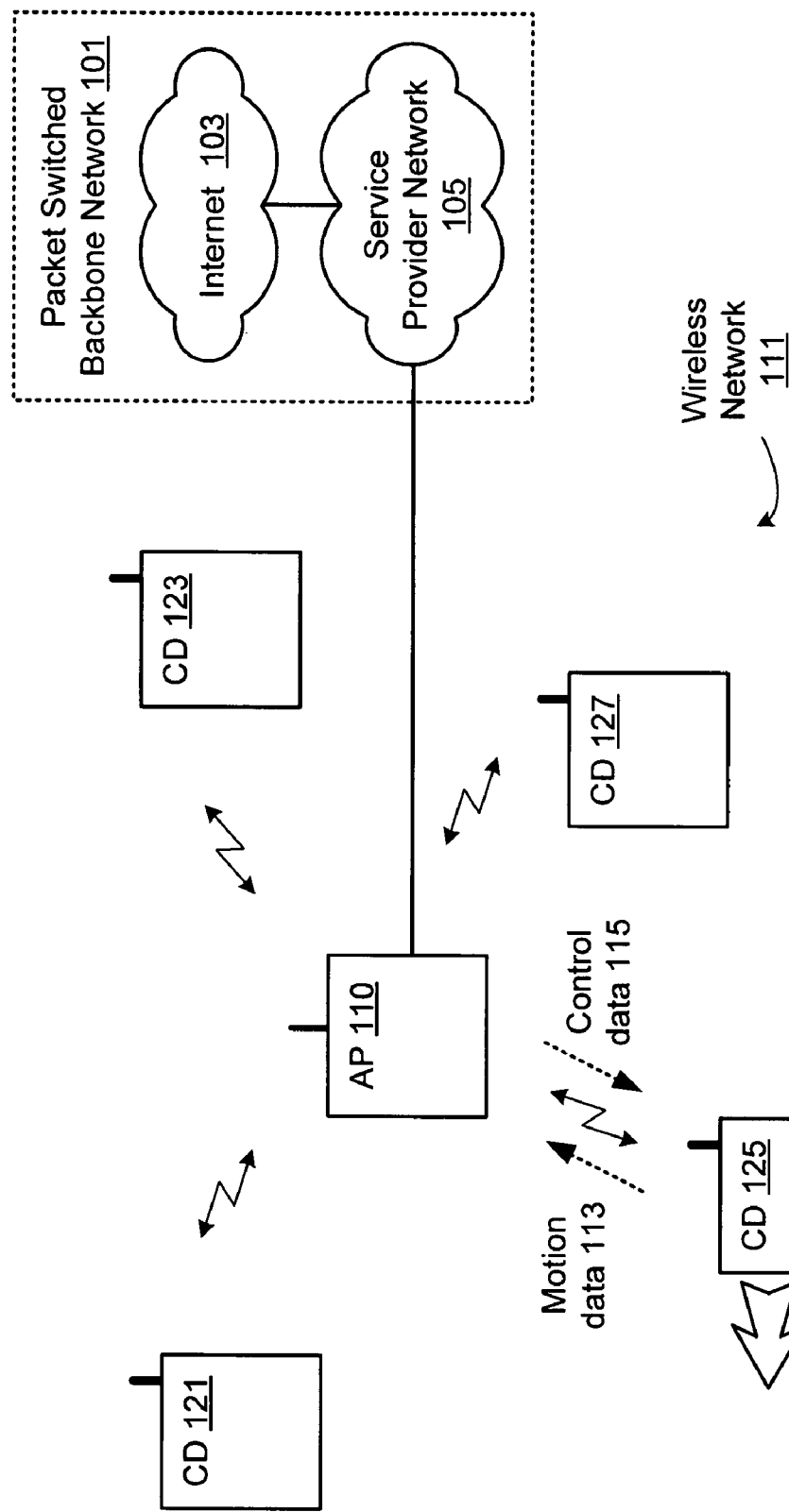

FIG. 3 presents a pictorial representation of a wireless network 111 in accordance with an embodiment of the present invention.

Figure 4:
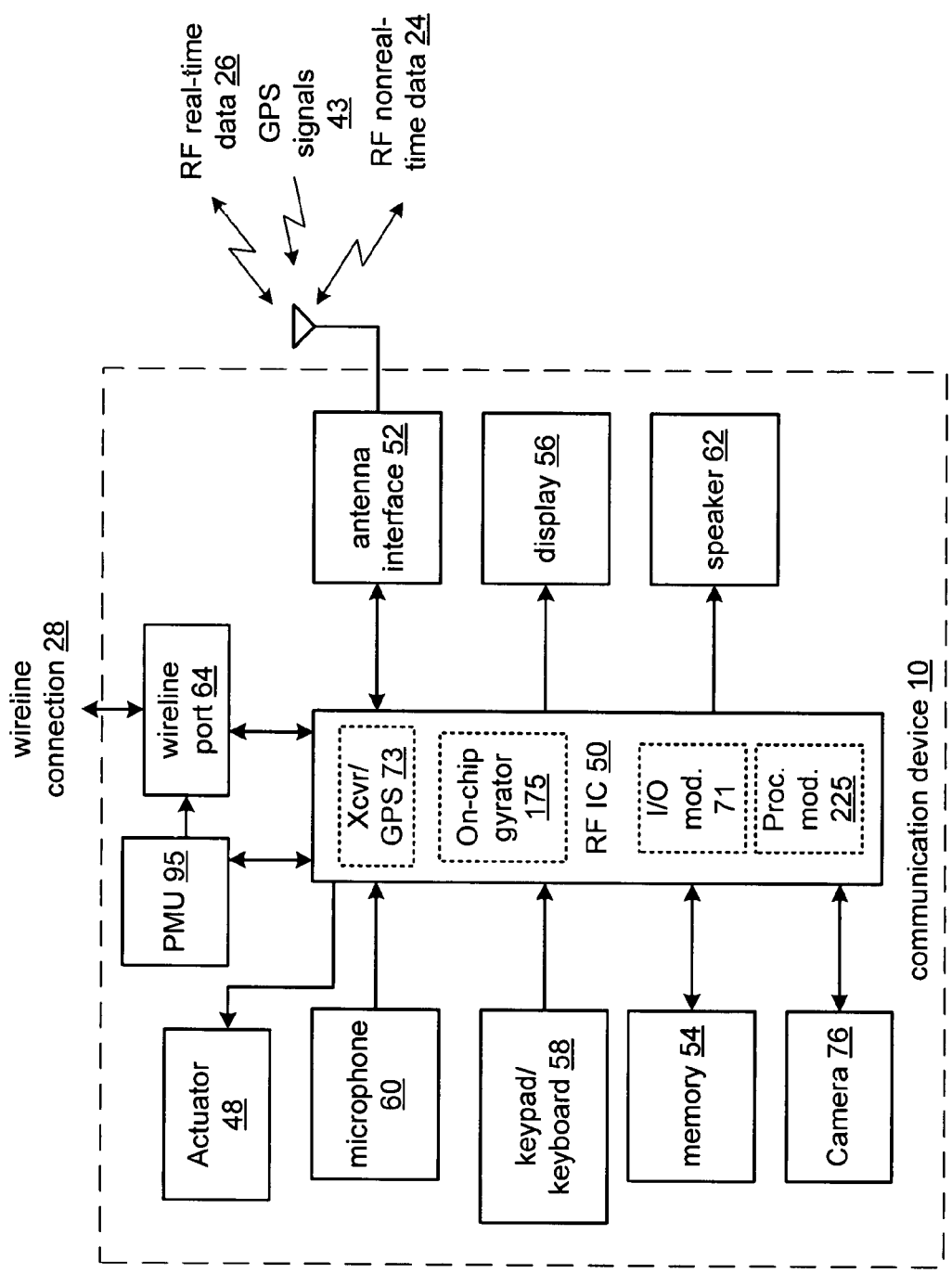

FIG. 4 is a schematic block diagram of an embodiment of a communication device 10 in accordance with the present invention.

Figure 5:
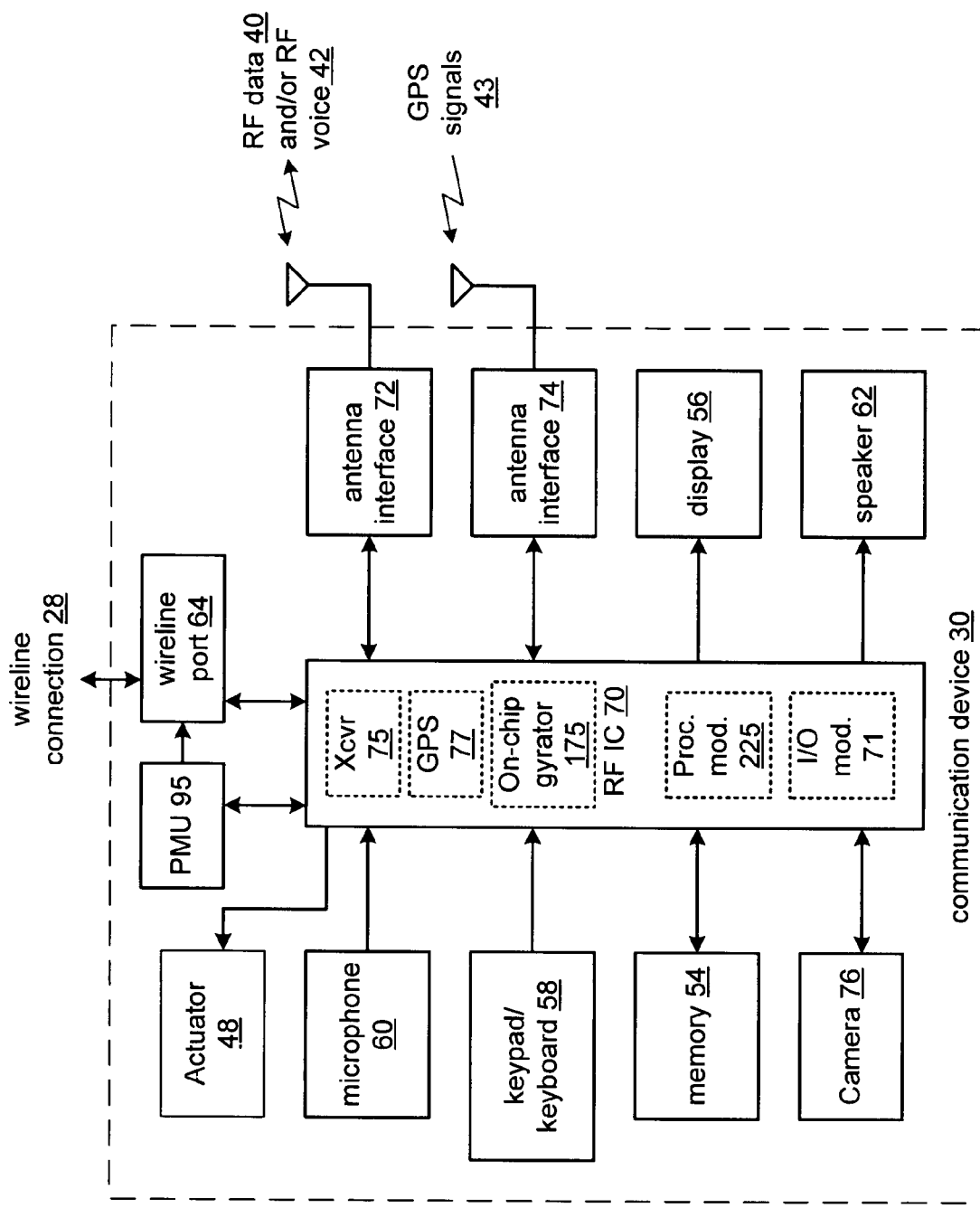

FIG. 5 is a schematic block diagram of a communication device 30 in accordance with another embodiment of the present invention.

Figure 6:
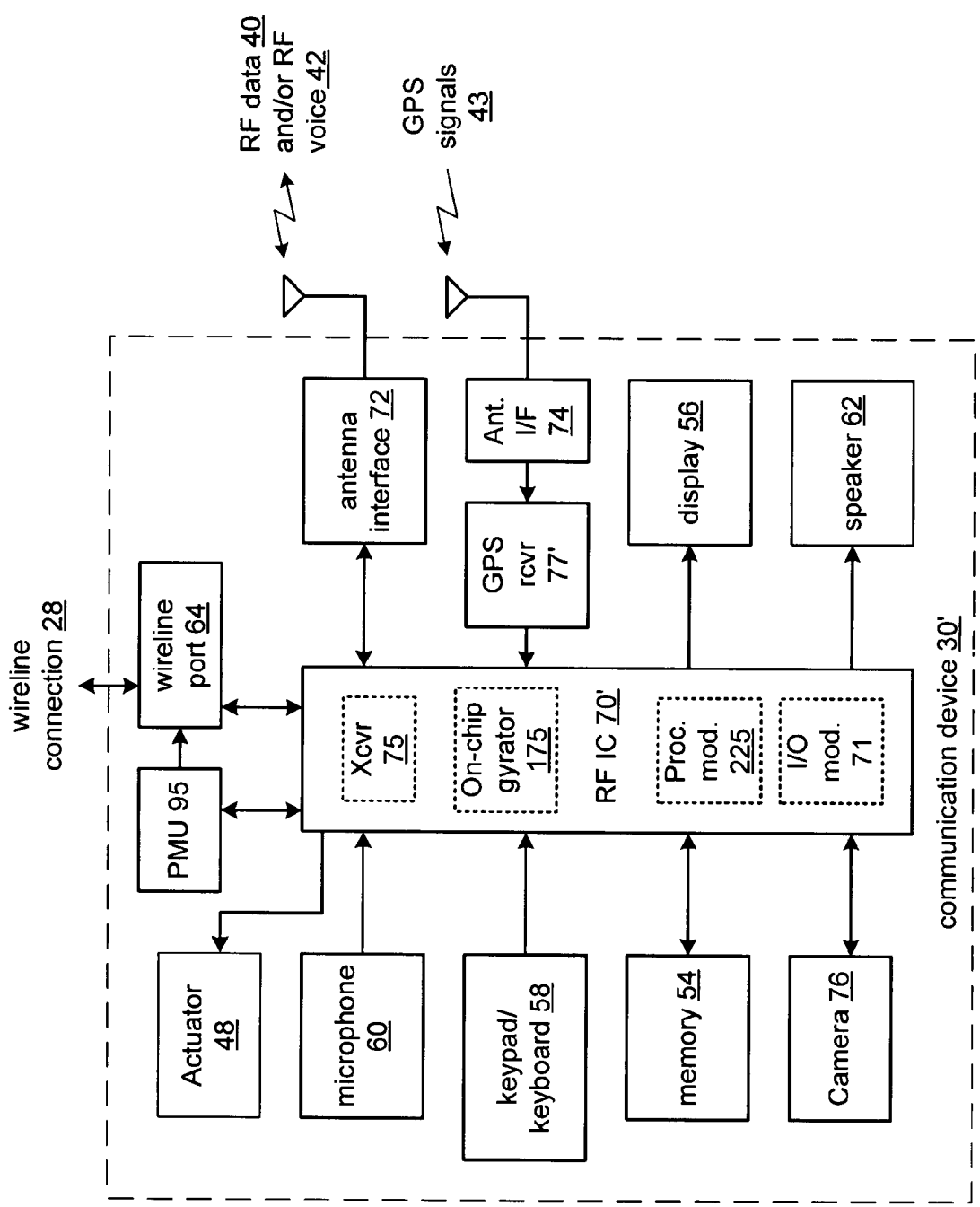

FIG. 6 is a schematic block diagram of a communication device 30' in accordance with another embodiment of the present invention.

Figure 7:
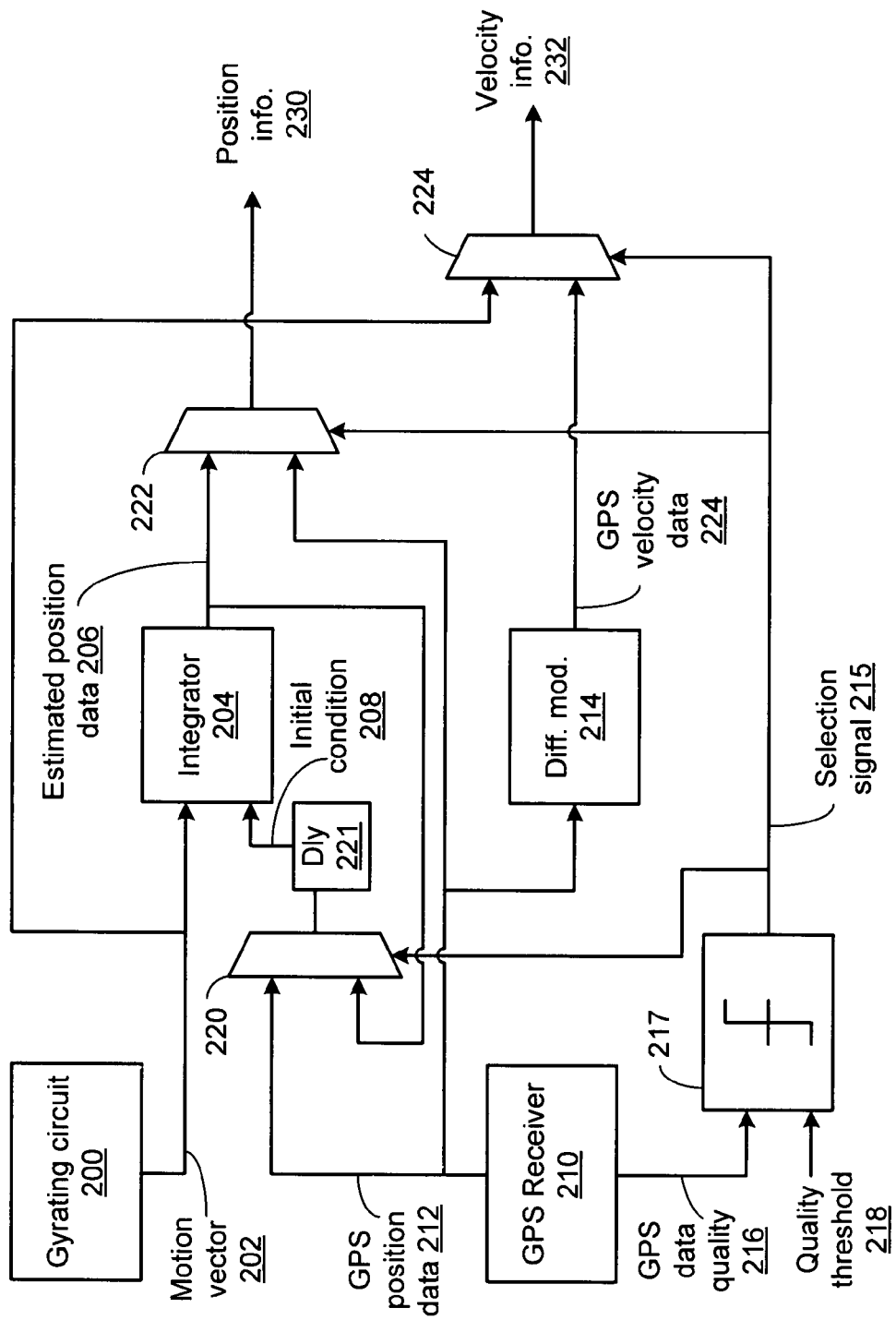

FIG. 7 is a schematic block diagram of a gyrating circuit 200 and GPS receiver 210 used to generate position and velocity information in accordance with an embodiment of the present invention.

Figure 8:
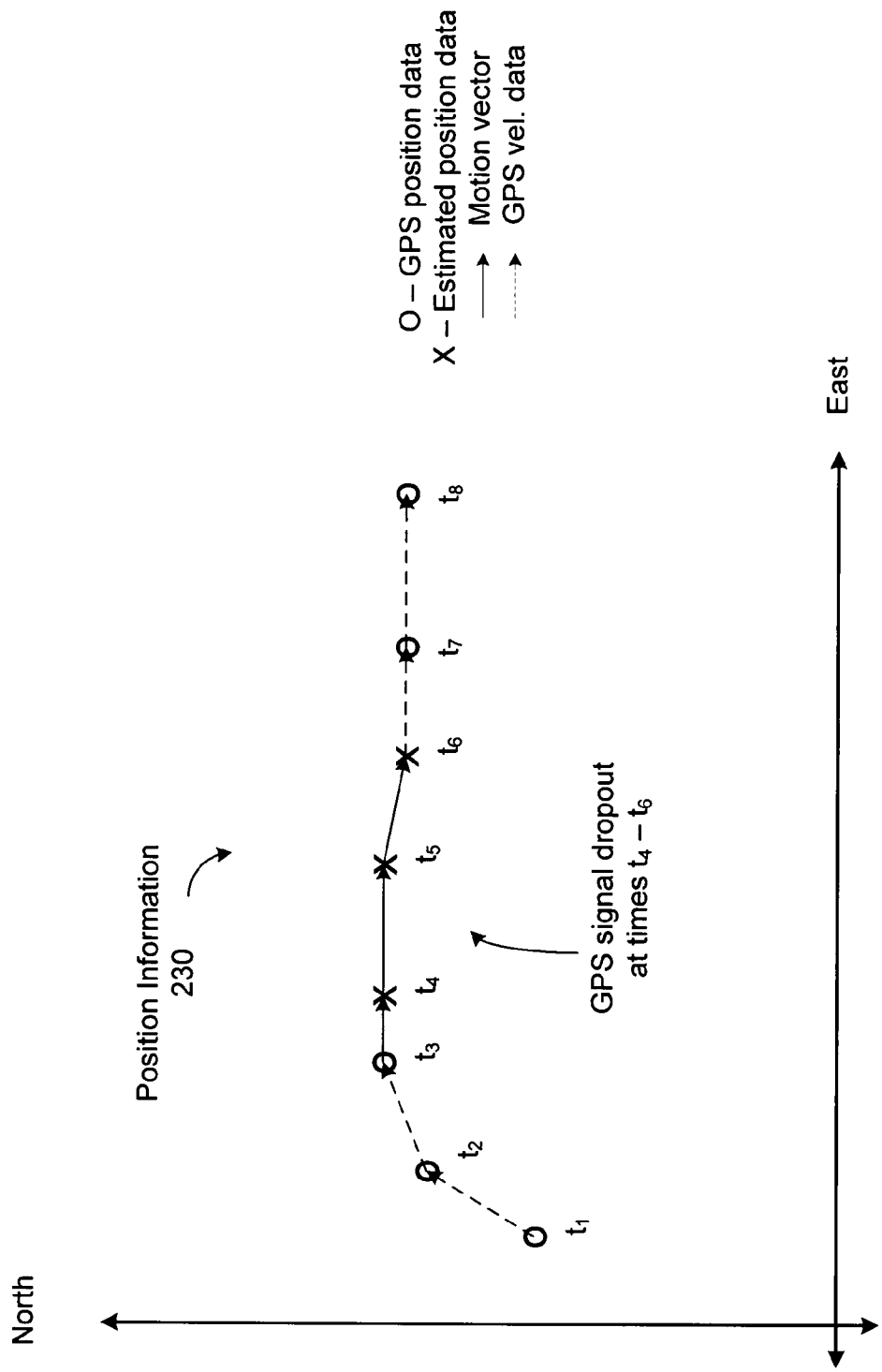

FIG. 8 is a graphical representation of position information determined in accordance with an embodiment of the present invention.

Figure 9:
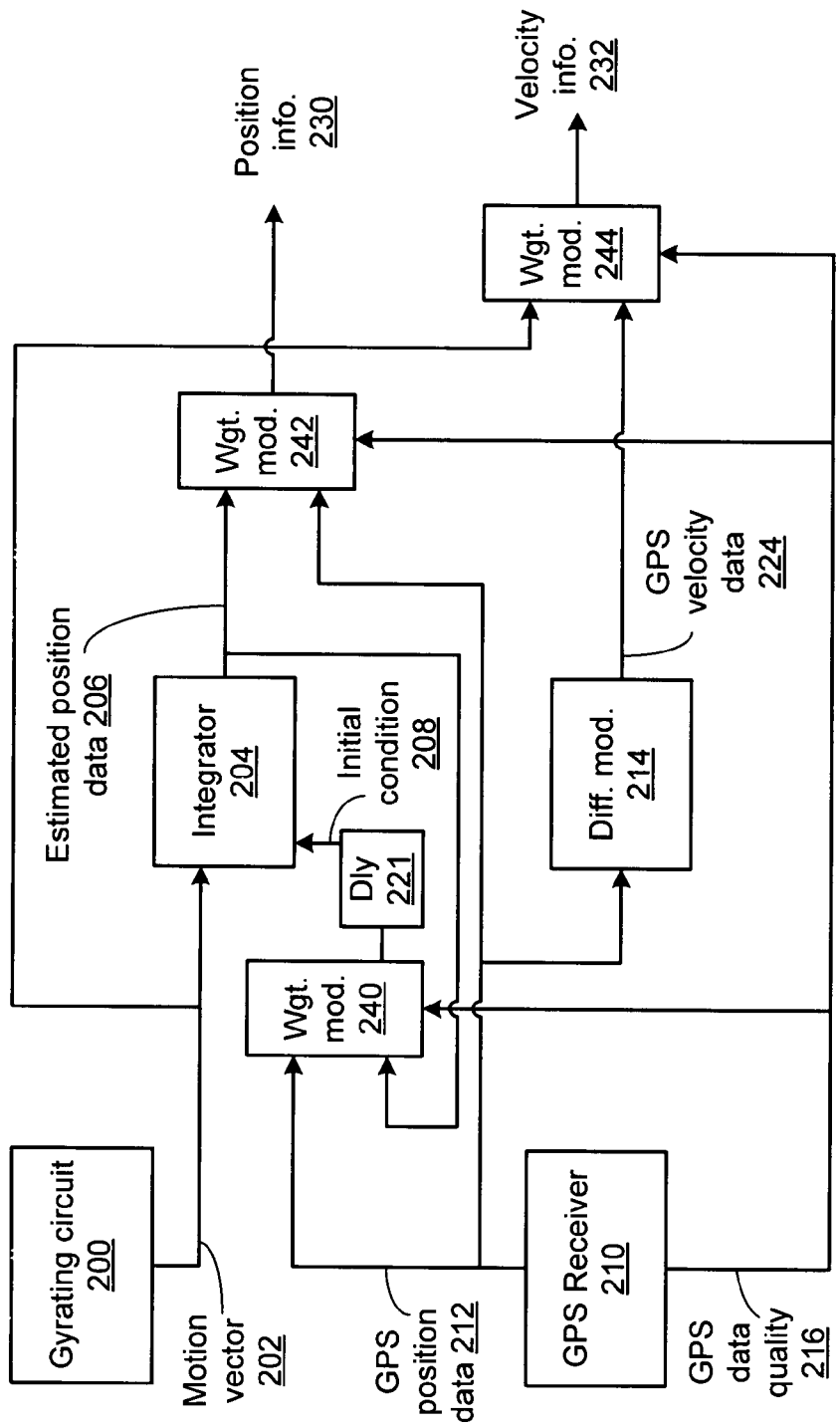

FIG. 9 is a schematic block diagram of a gyrating circuit 200 and GPS receiver 210 used to generate position and velocity information in accordance with another embodiment of the present invention.

Figure 10:
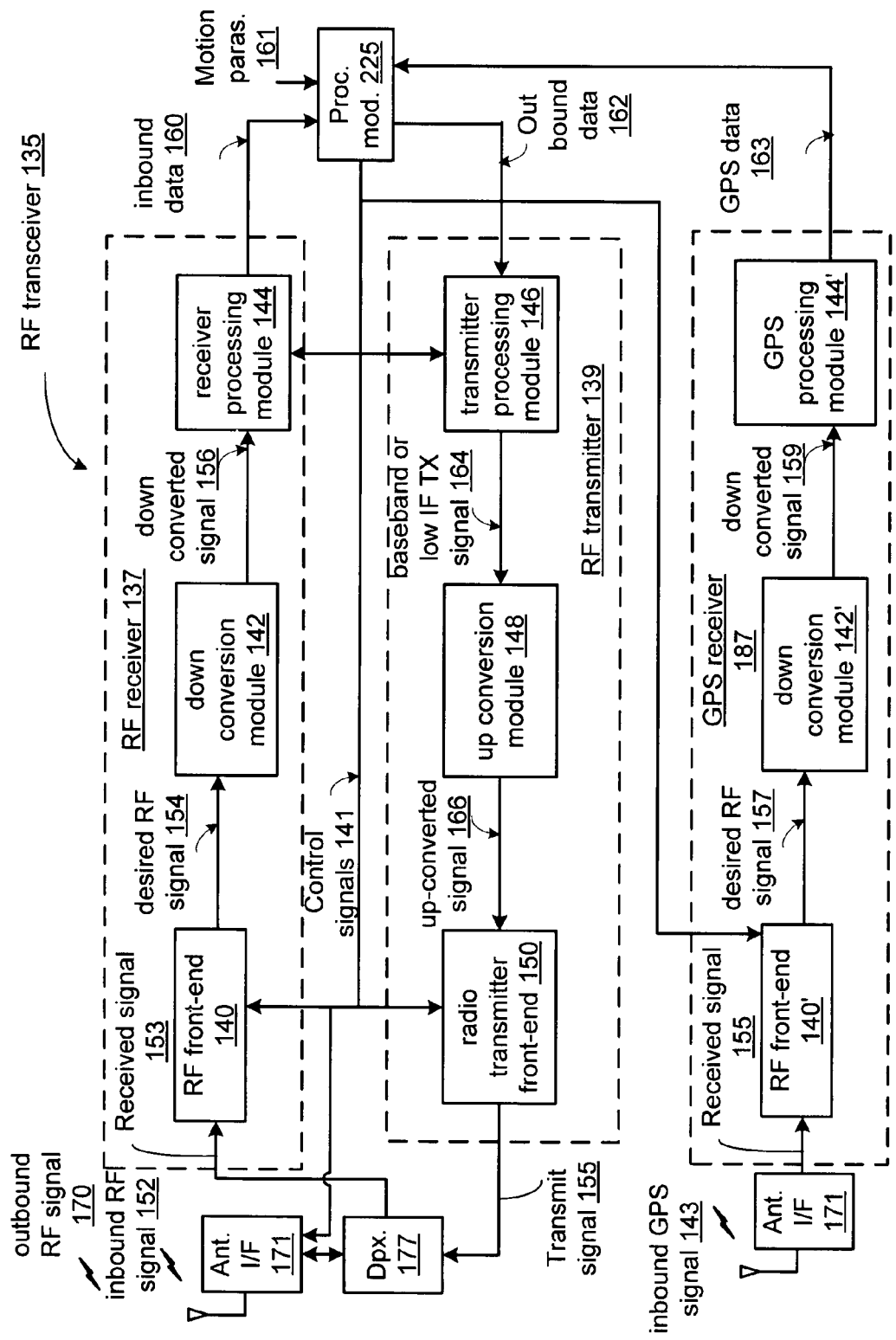

FIG. 10 is a schematic block diagram of an embodiment of RF transceiver 135 and GPS receiver 187 in accordance with the present invention.

Figure 11:
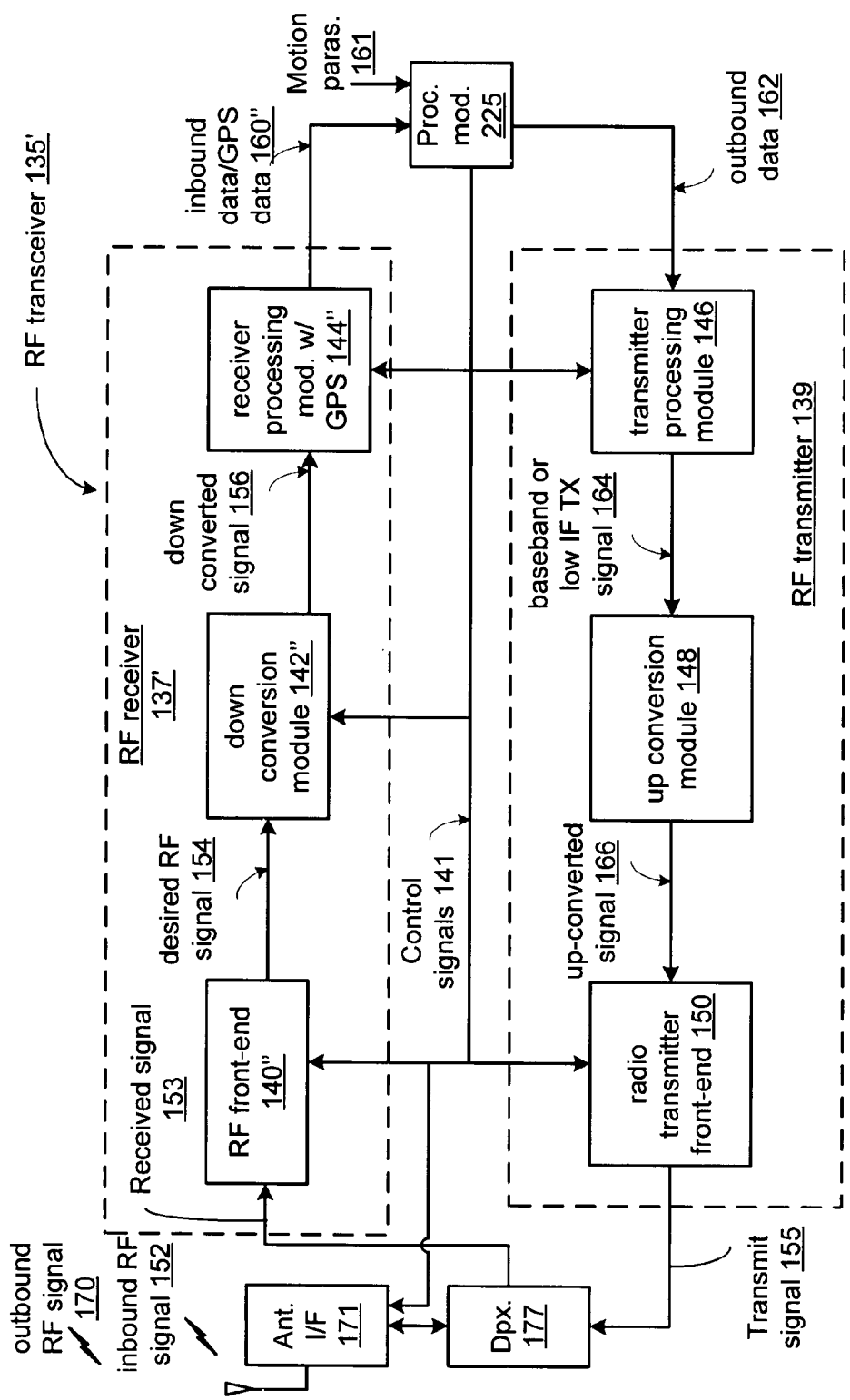

FIG. 11 is a schematic block diagram of an embodiment of RF transceiver 135' and with dual mode receiver 137' in accordance with the present invention.

Figure 12:
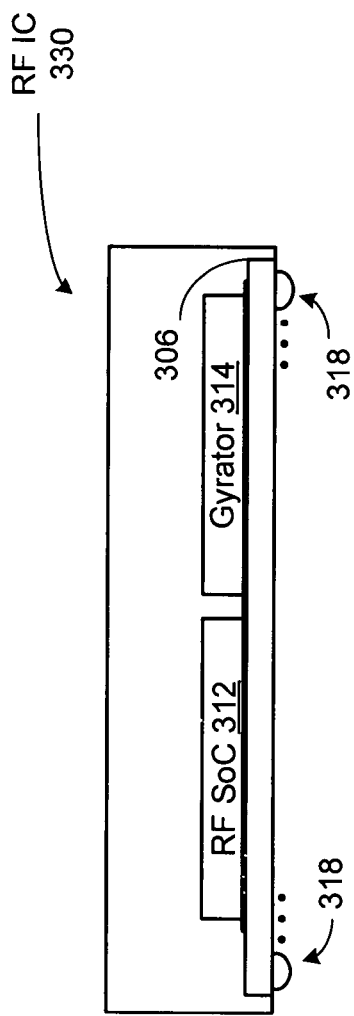

FIG. 12 is a side view of a pictorial representation of an integrated circuit package in accordance with an embodiment of the present invention.

Figure 13:
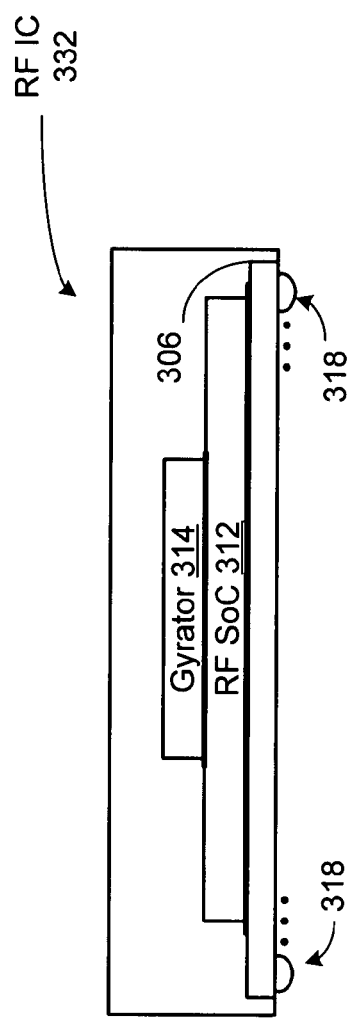

FIG. 13 is a side view of a pictorial representation of an integrated circuit package in accordance with an embodiment of the present invention.

Figure 14:
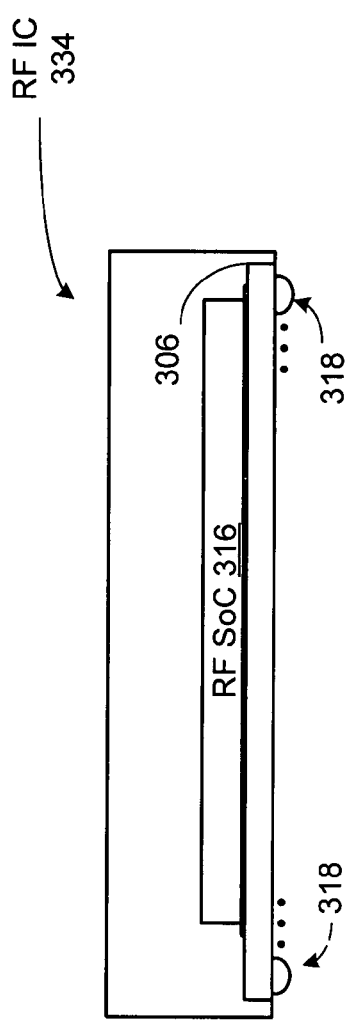

FIG. 14 is a side view of a pictorial representation of an integrated circuit package in accordance with an embodiment of the present invention.

Figure 15:
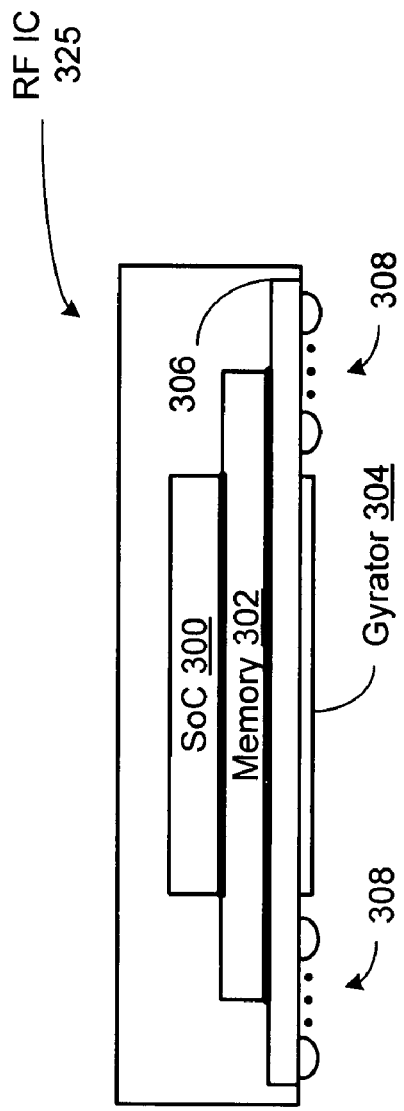

FIG. 15 is a side view of a pictorial representation of an integrated circuit package in accordance with an embodiment of the present invention.

Figure 16:
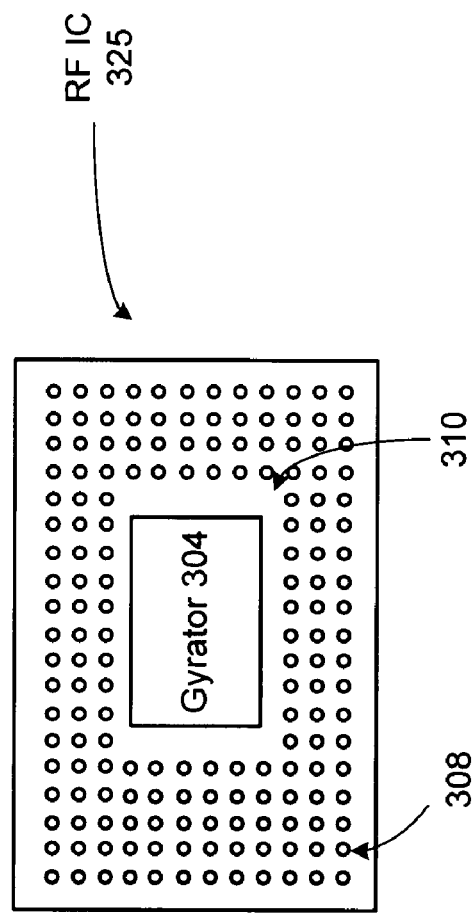

FIG. 16 is a bottom view of a pictorial representation of an integrated circuit package in accordance with an embodiment of the present invention.

FIG. 17 is a flow chart of an embodiment of a method in accordance with the present invention.

Figure 18:
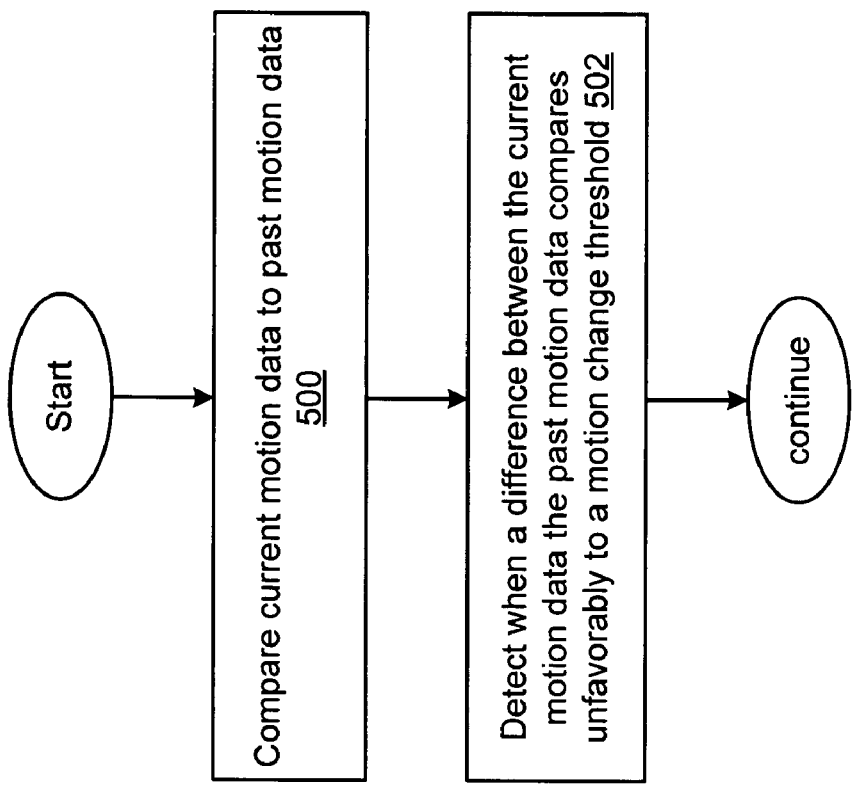

FIG. 18 is a flow chart of an embodiment of a method in accordance with the present invention.

Figure 19:
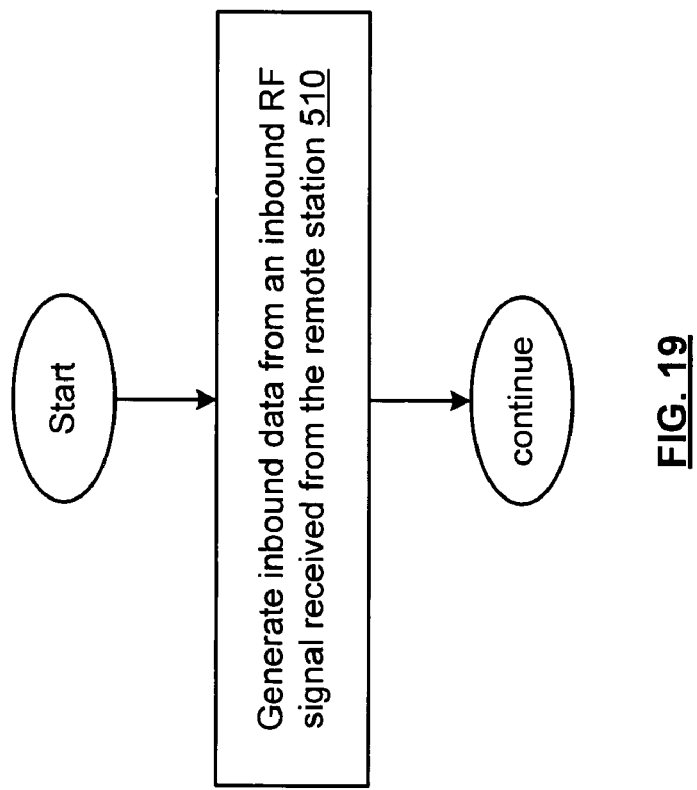

FIG. 19 is a flow chart of an embodiment of a method in accordance with the present invention.

Figure 20:
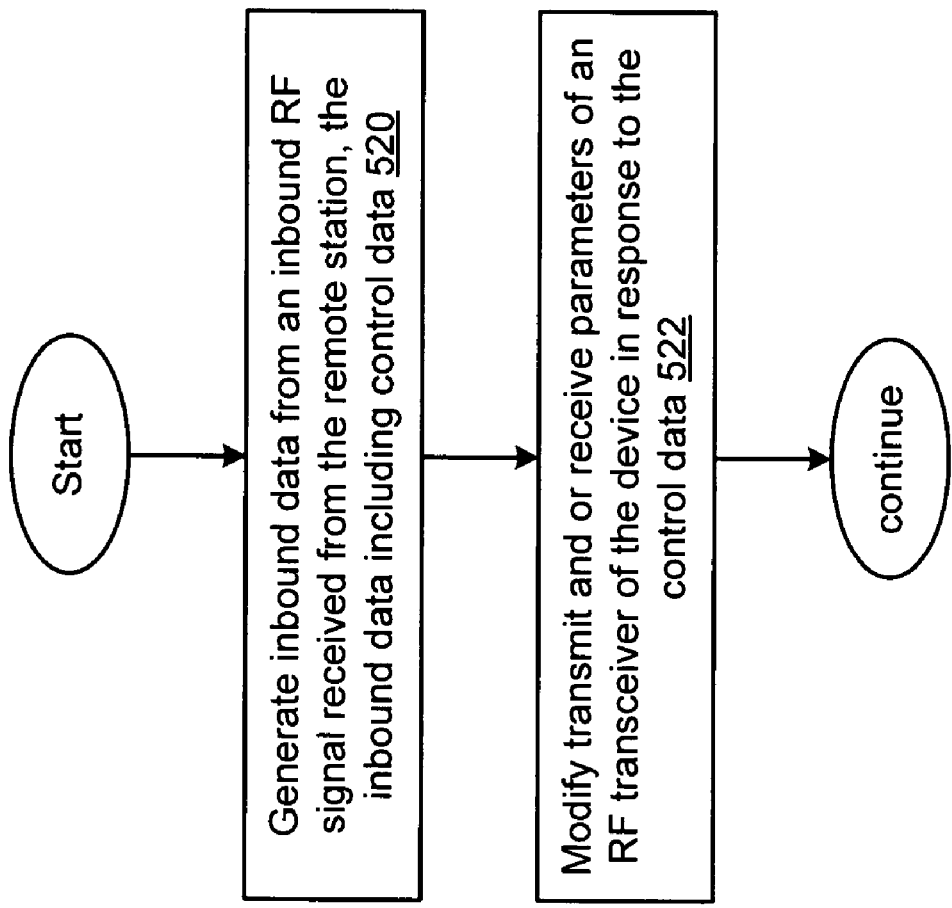

FIG. 20 is a flow chart of an embodiment of a method in accordance with the present invention.

Figure 21:
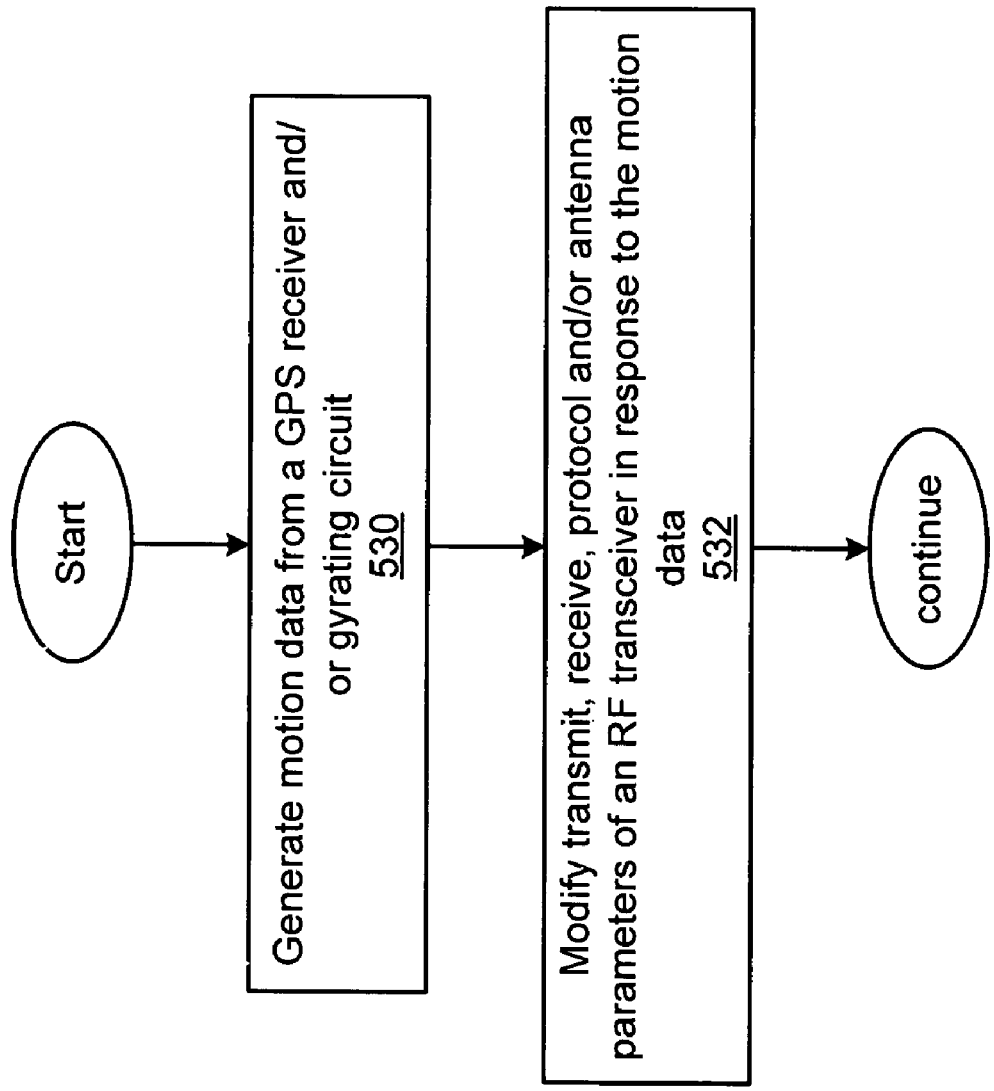

FIG. 21 is a flow chart of an embodiment of a method in accordance with the present invention.

Figure 22:
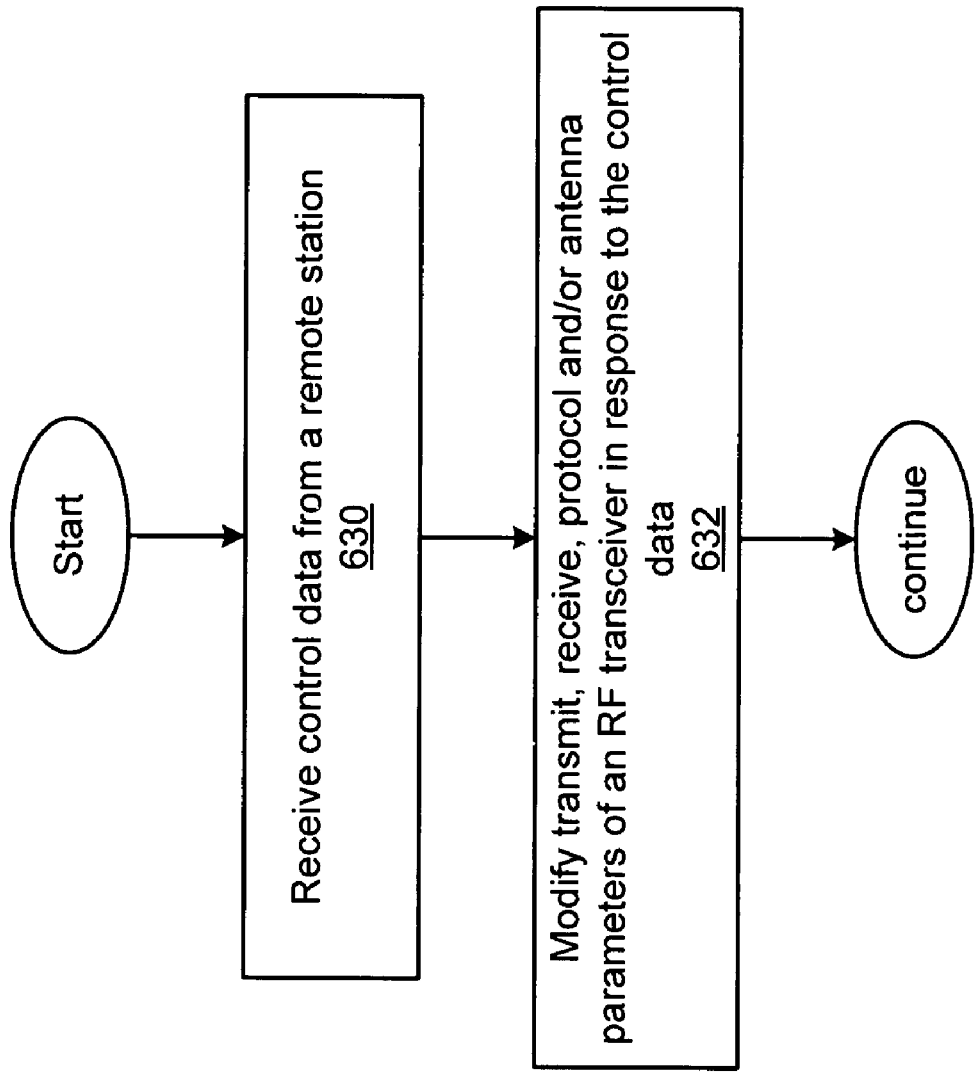

FIG. 22 is a flow chart of an embodiment of a method in accordance with the present invention.

DETAILED DESCRIPTION OF THE INVENTION

Figure 1:
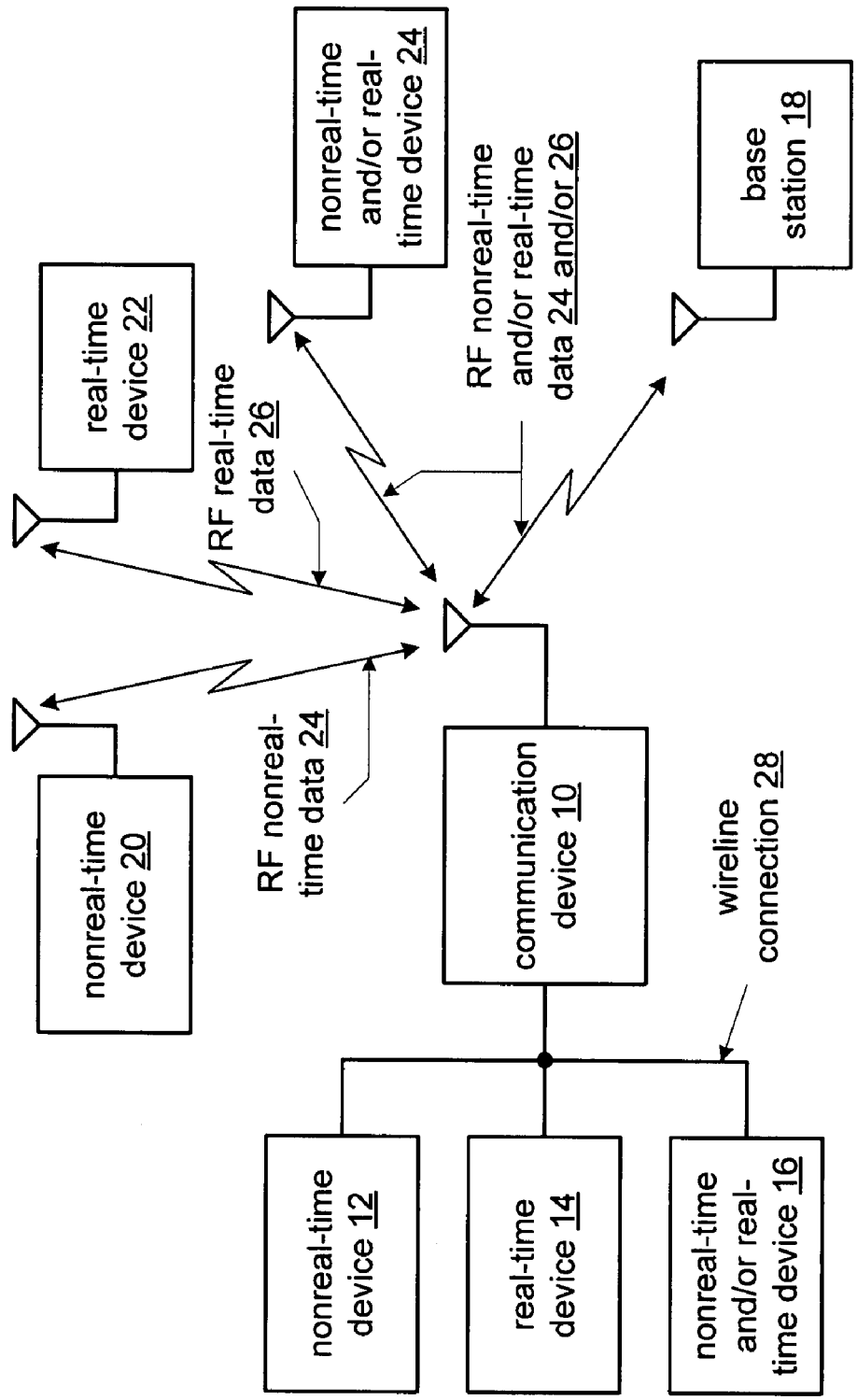
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and non-real-time data 26 wirelessly with one or more other devices such as base station 18, non-real-time device 20, real-time device 22, and non-real-time and/or real-time device 24. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, game device, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes an integrated circuit, such as an RF integrated circuit that includes one or more features or functions of the present invention. Such integrated circuits shall be described in greater detail in association with FIGS. 3-22 that follow.

Figure 2:
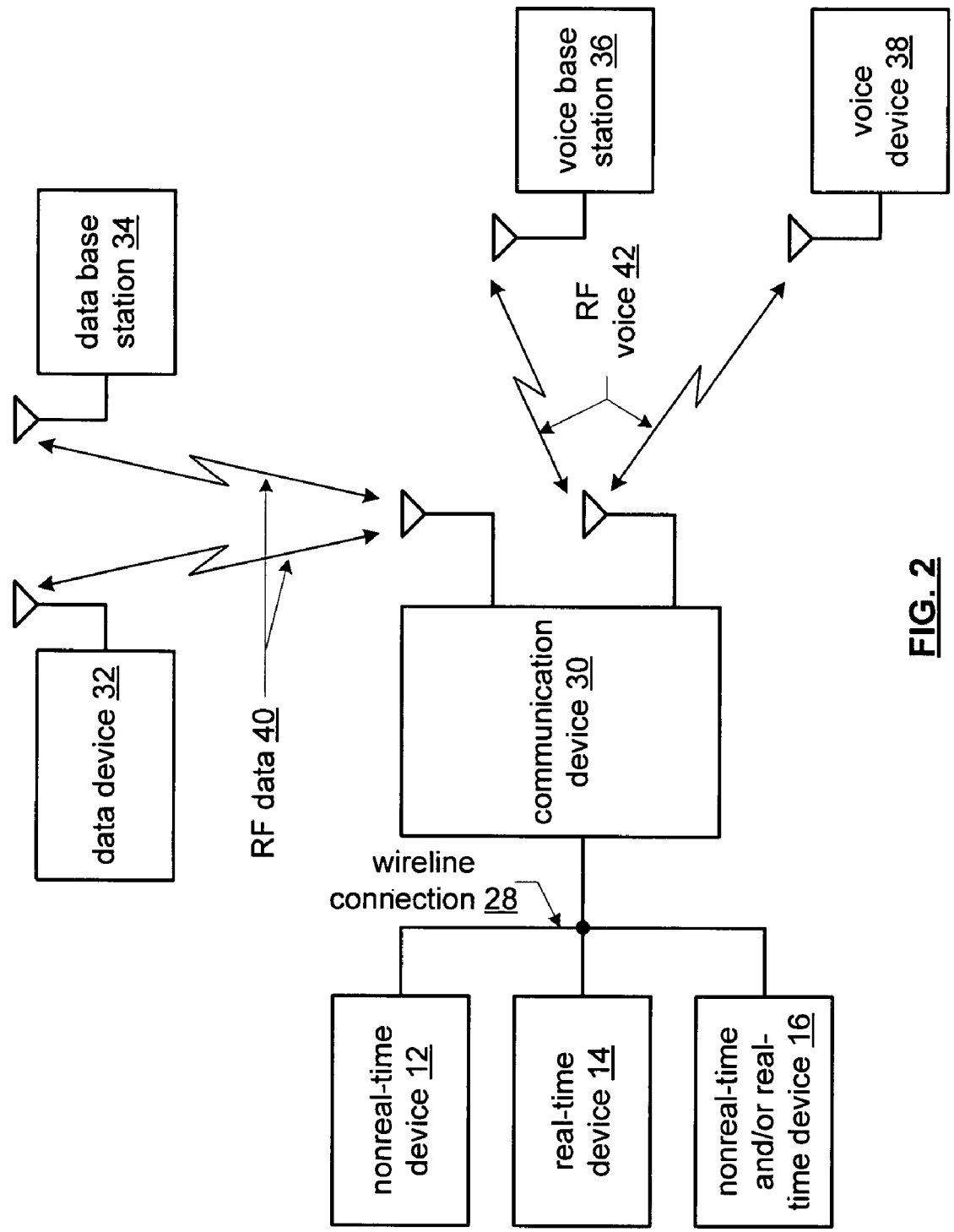
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes one or more separate wireless transceivers for communicating, contemporaneously, via two or more wireless communication protocols with data device 32 and/or data base station 34 via RF data 40 and voice base station 36 and/or voice device 38 via RF voice signals 42.

FIG. 3 presents a pictorial representation of a wireless network 111 in accordance with an embodiment of the present invention. The wireless network 111 includes an access point 110 that is coupled to packet switched backbone network 101. The access point 110 manages communication flow over the wireless network 111 destined for and originating from each of communication devices 121, 123, 125 and 127. Via the access point 110, each of the communication devices 121, 123, 125 and 127 can access service provider network 105 and Internet 103 to, for example, surf web-sites, download audio and/or video programming, send and receive messages such as text messages, voice message and multimedia messages, access broadcast, stored or streaming audio, video or other multimedia content, play games, send and receive telephone calls, and perform any other activities, provided directly by access point 110 or indirectly through packet switched backbone network 101.

One or more of the communication devices 121, 123, 125 and 127, such as communication device 125 is a mobile device that can include the functionality of communication devices 10 or 30. In particular, communication device 125 includes an RF integrated circuit (IC) having an on-chip gyrating circuit that generates a motion parameter based on motion of the device including a velocity, velocity vector, acceleration (including deceleration) and/or other motion parameter. In addition, communication device 125 includes a GPS receiver that generates GPS position data and/or GPS velocity data. The RF IC processes the motion parameter along with the GPS position data and GPS velocity data to produce motion data 113, such as position information and velocity information that identifies the location, velocity, and or direction of motion of the communication device 125. The RF IC can use data from either the gyrator or the GPS receiver or both to generate the motion data. If for instance the GPS receiver is running and receiving a strong signal, GPS position and velocity data can be used to generate the motion data 113. If however, the GPS receiver is starting up, has lost satellite reception or is otherwise generating inaccurate data, the gyrator can be used to generate velocity information and can further generate position information from the last know position coordinates.

The RF IC optionally generates outbound data that includes the motion data 113 and/or a flag or other data that indicates communication device 125 is a mobile device, generates an outbound RF signal from outbound data and transmits the outbound RF signal to a remote station, such as the access point 110.

In operation, access point 110 can change its own transmit and receive characteristics, based on the knowledge that communication device 125 is mobile, is in motion and/or based on information from a velocity vector or other motion data 113 that indicates that the communication device 125 is moving into closer range, is moving out of range, is moving close to a known source of interference, is moving into or away from an obstructed path, etc. Examples of transmit and receive characteristics include: transmit power levels; antenna configurations such as multi-input multi-output (MIMO) configuration, beam patterns, polarization patterns, diversity configurations, etc. to adapt the orientation and/or position of the communication device; protocol parameters and other transmit and receive characteristics of the access point.

In addition, access point 110 can generate control data 115 to transmit to the communication device 125 and/or the communication devices 121, 123 and 127, to modify the transmit and receive characteristics of these devices. Further, in an embodiment of the present invention, access point 110 can generate a request to receive periodic motion data from the communication device 125. Alternatively, communication device 125 can generate and transmit motion data on a regular and/or periodic basis or in response to changes in motion data 113 that compare unfavorably (such as to exceed) a motion change threshold, such as to inform the access point 110 when the communication device 125 starts, stops, changes speed and/or direction, etc.

For example, when communication device 125 indicates to access point 110 that it is a mobile device, access point 110 can request that communication device 125 send periodic motion data. If the access point 110 determines that the communication device 125 is moving out of range, it can increase its power level, and steer its antenna beam in the direction of the mobile device 125 and command the mobile device 125 to modify one or more if its transmit and/or receive parameters, to increase its power level, steer its antenna beam at the access point and/or to modify other antenna parameters to compensate for a possible lowering of signal to noise ratio, etc.

Further access point 110 can operate to manage the transmit and receive characteristics by the adjustment of the protocol or protocols used in communicating between the access point 110 and the client devices 121, 123, 125 and 127 and power levels inherent in and associated therewith. In one mode of operation, access point 110 can selectively adjust one or more protocol parameters, such as the packet length, data rate, forward error correction, error detection, coding scheme, data payload length, contention period, and back-off parameters used by access point 110 in communication with one or more of the client devices 121, 123, 125 and 127, based on the analysis of the motion data 113. In this fashion, the protocol parameters can be adapted to compensate for the motion of one or more communication devices, such as communication device 125, to conserve power, increase throughput, and/or to minimize unnecessary transmission power utilization based on the conditions of the network.

For example, in the event that a communication device, such as client device 125 is anticipated to have difficulty detecting transmissions from communication device 123 because it is moving out of range, access point 110 can modify the protocol parameters so that transmissions by communication device 125 include more aggressive error correcting codes, increased back-off times and/or smaller data payloads or packet length to increase the chances that a packet will be received in the event of contention by communication device 123. In addition, decreasing the packet length can increase the frequency of acknowledgements transmitted by access point 110. These acknowledgements can be transmitted at a power level sufficient to be heard by communication device 123. With increased back-off times, communication device 123 has less opportunity to create a potential contention.

In a further mode of operation, access point 110 and communication devices 121, 123, 125 and 127 can operate using a plurality of different, and potentially complimentary, protocols having different protocol parameters. Access point 110 can likewise select a particular one of a plurality of protocols that suits the particular conditions present in the wireless network 111, as determined based on an assessment of motion data 113. For instance, an access point can select from 802.11(n), 802.11(g) or 802.11(b) protocols having different protocol parameters, data rates, etc, based on the particular protocol best suited to the current mobility status of communication devices 121, 123, 125 and 127.

While the description above has focused on the control of transmit and receive characteristics of communication devices 121, 123, 125 and 127 based on control data 115 received from access point 110, in an embodiment of the present invention, each of these communication devices can respond to its own motion data, such as motion data 113, to control its transmit and receive characteristics, without intervention from the access point. For example, if the communication device 125 determines it is moving out of range, it can increase its power level, and steer its antenna beam in the direction of the access point 110 and/or modify other protocol parameters to compensate for a possible lowering of signal to noise ratio, etc.

FIG. 4 is a schematic block diagram of an embodiment of an integrated circuit in accordance with the present invention. In particular, an RF integrated circuit (IC) 50 is shown that implements communication device 10 in conjunction with microphone 60, keypad/keyboard 58, memory 54, speaker 62, display 56, camera 76, antenna interface 52 and wireline port 64. In operation, RF IC 50 includes a dual mode transceiver/GPS receiver 73 having RF and baseband modules for receiving GPS signals 42 and further for transmitting and receiving data RF real-time data 26 and non-real-time data 24 via an antenna interface 52 and antenna such as fixed antenna a single-input single-output (SISO) antenna, a multi-input multi-output (MIMO) antenna, a diversity antenna system, an antenna array or other antenna configuration that allows the beam shape, gain, polarization or other antenna parameters to be controlled. In addition, RF IC 50 includes input/output module 71 that includes the appropriate interfaces, drivers, encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Power management circuit (PMU) 95 includes one or more DC-DC converters, voltage regulators, current regulators or other power supplies for supplying the RF IC 50 and optionally the other components of communication device 10 and/or its peripheral devices with supply voltages and or currents (collectively power supply signals) that may be required to power these devices. Power management circuit 95 can operate from one or more batteries, line power, an inductive power received from a remote device, a piezoelectric source that generates power in response to motion of the integrated circuit and/or from other power sources, not shown. In particular, power management module can selectively supply power supply signals of different voltages, currents or current limits or with adjustable voltages, currents or current limits in response to power mode signals received from the RF IC 50. While shown as an off-chip module, PMU 95 can alternatively implemented as an on-chip circuit.

In addition, RF IC 50 includes an on-chip gyrating circuit such as on-chip gyrator 175 that generates a motion parameter based on motion of the RF IC 50. In an embodiment of the present invention, the on-chip gyrator is implemented with microelectromechanical systems (MEMS) technology to form a piezoelectric gyroscope, a vibrating wheel gyroscope, a tuning fork gyroscope, a hemispherical resonator gyroscope, or a rotating wheel gyroscope along one, two or three axes to indicate motion in one, two or three dimensions. In particular, the on-chip gyrating circuit includes a gyroscope element that is formed via dry etching, wet etching, electro discharge machining and/or via other MEMS or non-MEMS technology. In operation, the on-chip gyrator responds to inertial forces, such as Coriolis acceleration, in one, two or three axes to generate motion data, such as a velocity vector in one, two or three dimensions.

In operation, the RF transceiver 73 generates an outbound RF signal from outbound data and generates inbound data from an inbound RF signal. Further, processing module 225 is coupled to the on-chip gyrating circuit and the RF transceiver, and processes the motion parameter to produce motion data, generates the outbound data that includes the motion data, and receives the inbound data that optionally includes data from an access point to modify transmit and/or receive parameters in response to the motion data that was transmitted.

As discussed in conjunction with FIG. 3, the communication device 10, such as a station set in communication with an access point, wireless telephone set that places and receives wireless calls through a wireless telephone network and/or a IP telephone system, via a base station, access point or other communication portal, operates through command by the processing module 225 to either respond directly to motion data, such as motion data 113, it generates from on-chip gyrator 175 and the GPS receiver to control the transmit and receive characteristics of transceiver 73 or to respond to control data, such as control data 115 received from an access point or other station to control the transmit and receive characteristics of transceiver 73. For example, if the communication device 10 determines it is moving out of range, it can increase its power level, and steer its antenna beam in the direction of the access point and/or modify other protocol parameters to compensate for a possible lowering of signal to noise ratio, modify its receiver sensitivity, etc. In addition, position information generated by GPS receiver and/or on-chip gyrator 175 can be included in the outbound RF signal sent to a telephone network to support a 911 call such as an E911 emergency call.

In an embodiment of the present invention, the RF IC 50 is a system on a chip integrated circuit that includes at least one processing device. Such a processing device, for instance, processing module 225, may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In further operation, the RF IC 50 executes operational instructions that implement one or more of the applications (real-time or non-real-time) attributed to communication devices 10 and/or 127 as discussed above and in conjunction with FIGS. 1-3.

FIG. 5 is a schematic block diagram of another embodiment of an integrated circuit in accordance with the present invention. In particular, FIG. 5 presents a communication device 30 that includes many common elements of FIG. 4 that are referred to by common reference numerals. RF IC 70 is similar to RF IC 50 and is capable of any of the applications, functions and features attributed to RF IC 50 as discussed in conjunction with FIG. 3. However, RF IC 70 includes a separate wireless transceiver 75 for transmitting and receiving RF data 40 and RF voice signals 42 and further a separate GPS receiver 77 for receiving GPS signals 43.

In operation, the RF IC 70 executes operational instructions that implement one or more of the applications (real-time or non-real-time) attributed to communication devices 30 and 127 as discussed above and in conjunction with FIG. 1-4.

FIG. 6 is a schematic block diagram of another embodiment of an integrated circuit in accordance with the present invention. In particular, FIG. 6 presents a communication device 30 that includes many common elements of FIG. 5 that are referred to by common reference numerals. RF IC 70' is similar to RF IC 70 and is capable of any of the applications, functions and features attributed to RF ICs 50 and 70 as discussed in conjunction with FIGS. 3-5. However, RF IC 70' operates in conjunction with an off-chip GPS receiver 77' for receiving GPS signals 43.

In operation, the RF IC 70' executes operational instructions that implement one or more of the applications (real-time or non-real-time) attributed to communication devices 10, 30 and 127 as discussed above and in conjunction with FIGS. 1-4.

FIG. 7 is a schematic block diagram of a gyrating circuit 200 and GPS receiver 210 used to generate position and velocity information in accordance with an embodiment of the present invention. In this embodiment, gyrating circuit 200, such as on-chip gyrator 175 and GPS receiver, such as GPS receiver 77, 77' or dual mode receiver 73 cooperate to generate position information 230 and velocity information 232 that can be used by communication devices 10, 30, 30' and/or 125 to control its own operation or to send to remote devices such as access point 110, a base station, telephone network or system, etc.

GPS receiver 210 generates GPS position data and GPS data quality signal 216. In operation, GPS receiver 210 is coupled to recover a plurality of coarse/acquisition (C/A) signals and a plurality of navigation messages from received GPS signals 43. The GPS receiver 210 utilizes the C/A signals and the navigations messages to determine the position of the communication device.

In particular, GPS receiver 210 generates one or more clock signals. The clock signal(s) may also be used by the GPS receiver 210 to determine the communication device's position. GPS receiver 210 determines a time delay for at least some of the plurality of C/A signals in accordance with the at least one clock signal. The GPS receiver calculates a distance to a corresponding plurality of satellites of the at least some of the plurality of C/A signals based on the time delays for the at least some of the plurality of C/A signals. In other words, for each GPS signal 43 received, which are received from different satellites, the GPS receiver 210 calculates a time delay with respect to each satellite that the communication device is receiving a GPS RF signal from, or a subset thereof. For instance, the GPS receiver 210 identifies each satellite's signal by its distinct C/A code pattern, then measures the time delay for each satellite. To do this, the receiver produces an identical C/A sequence using the same seed number as the satellite. By lining up the two sequences, the receiver can measure the delay and calculate the distance to the satellite, called the pseudorange. Note that overlapping pseudoranges may be represented as curves, which are modified to yield the probable position.

GPS receiver 210 can calculate the position of the corresponding plurality of satellites based on corresponding navigation messages of the plurality of navigation messages. For example, the GPS receiver 210 uses the orbital position data of the navigation message to calculate the satellite's position. The GPS receiver 210 can determine the location of the RF IC 50, 70 or 70' (and therefore communication device 10, 30, 30' or 127) based on the distance of the corresponding plurality of satellites and the position of the corresponding plurality of satellites. For instance, by knowing the position and the distance of a satellite, the GPS receiver 210 can determine it's location to be somewhere on the surface of an imaginary sphere centered on that satellite and whose radius is the distance to it. When four satellites are measured simultaneously, the intersection of the four imaginary spheres reveals the location of the receiver. Often, these spheres will overlap slightly instead of meeting at one point, so the receiver will yield a mathematically most-probable position that can be output as GPS position data 212. In addition, GPS receiver 210 can determine the amount of uncertainty in the calculation that is output as the GPS data quality 216. In the event that the GPS receiver 210 loses lock or otherwise receives insufficient signal from enough satellites to generate a GPS of even minimal accuracy, a minimum value of the GPS data quality signal can be assigned.

At the same time, gyrating circuit 200 generates a motion vector 202 that is integrated by integrator 204 based on an initial condition 208 that is either its own prior estimated position data 206 or the prior GPS position data 212. By adding the motion vector 202 to the prior position, new estimated position data 206 can be generated.

In this embodiment, the GPS data quality 216 is compared with a value, such as quality threshold 218 that corresponds to a level of quality that is roughly on par with accuracy of position information that can be estimated using the gyrator circuit 200. If the GPS data quality 216 compares favorably to the quality threshold, the position information 230 is selected by multiplexer 222 as the GPS position data 212 in response to the selection signal 215 from comparator 217. When the GPS data quality 216 compares unfavorably to the quality threshold 218, such as during a dropout condition, the selection signal 215 from comparator 217 selects the position information 230 from the estimated position data 206. The estimated position data 206 is initially generated from the prior (good) value of the GPS position data 212 (delayed by delay 221) and the current motion vector 202. If the dropout condition persists, the integrator 204 generates new estimated position data 206 based on the current motion vector 202 and the prior estimated position 206, as selected by multiplexer 220 in response to selection signal 215. While an integrator 204 is shown in this configuration, low-corner frequency low-pass filters, integrators with additional filtration and/or other filter configurations could likewise be employed. For instance, estimated position data 206 can be generated based on a filtered difference between current motion vector values and either past GPS position data 212 or past estimated position data 206, to provide more accurate estimates, to reject noise and/or to otherwise smooth the estimated position data 206.

In a similar fashion, velocity information 232 is generated either from the gyrating circuit 200 or from the GPS receiver 210. In particular, when the GPS data quality 216 compares favorably to quality threshold 218, velocity information 232 is selected from a difference module 214 that generates a velocity from the difference between successive values of the GPS position data 212. If however, the GPS data quality 216 compares unfavorably to the quality threshold 218, the velocity information 232 is selected instead from the motion vector 202.

While shown in a schematic block diagram as separate modules, the integrator 204, difference module 214, comparator 217, and multiplexers 220, 222, and 224 can likewise be implemented as part of processing module 225 either in hardware, firmware or software.

FIG. 8 is a graphical representation of position information determined in accordance with an embodiment of the present invention. In particular, position information 230 is shown that shows a graph, in map/Cartesian coordinates, of position information that progresses from times $t_1$-$t_8$, corresponding to sample times or other discrete intervals used to generate and/or update position information 230. The first three times, position data is derived from GPS position data such as GPS position data 212. The velocity information, as shown for this interval, is GPS velocity data that is derived by the difference between the GPS position data. In this example, a GPS signal dropout covers times $t_4$-$t_6$. At time $t_4$, the GPS position data may be unreliable or inaccurate, so the new position is estimated position data that is generated from the prior GPS position data at time $t_3$, and updated by the current motion vector, such as motion vector 202 from the gyrating circuit. At times $t_5$ and $t_6$, the GPS position data still may be unreliable or inaccurate, so the new position is estimated position data that is generated from the prior GPS position data (in this case prior estimated positions), updated by the current motion vector. At time $t_7$ and $t_8$, when the GPS position data again becomes reliable, the GPS position data is used to generate the position information.

FIG. 9 is a schematic block diagram of a gyrating circuit 200 and GPS receiver 210 used to generate position and velocity information in accordance with another embodiment of the present invention. In particular, a system is shown that includes similar elements from FIG. 7 that are referred to by common reference numerals. In this embodiment however, data from the gyrating circuit 200 and GPS receiver 210 are blended, based on the GPS data quality 216. In particular, weighting modules 240, 242, and 244 are provided that form the position information 230, the velocity information 232 and the initial condition 208 based on a weighted average of the GPS and gyrator produced values, wherein the weighting coefficients are dynamically chosen based on the GPS data quality 216.

For instance, for the value of the GPS data quality 216 corresponding to the highest accuracy GPS data, the weighting coefficients can be chosen to maximize the weight of the GPS position 212, and to minimize the weight of the estimated position data 206 in calculating the initial condition 208 and the position information 230 and further to maximize the weight of the GPS velocity data 224, and to minimize the weight of the motion vector 202 in calculating the velocity information 232. Further, for the value of the GPS data quality corresponding to the lowest accuracy GPS data (including a dropout condition), the weighting coefficients can be chosen to minimize the weight of the GPS position 212, and to maximize the weight of the estimated position data 206 in calculating the initial condition 208 and the position information 230 and further to minimize the weight of the GPS velocity data 224, and to maximize the weight of the motion vector 202 in calculating the velocity information 232. Also, for intermediate values of the GPS data quality 216, intermediate weighting values could be used that blend the GPS data with the data derived from the gyrating circuit to generate more robust estimates of these values.

FIG. 10 is a schematic block diagram of an embodiment of RF transceiver 135 and GPS receiver 187 in accordance with the present invention. The RF transceiver 135, such as transceiver 75 includes an RF transmitter 139, and an RF receiver 137. The RF receiver 137 includes a RF front end 140, a down conversion module 142 and a receiver processing module 144. The RF transmitter 139 includes a transmitter processing module 146, an up conversion module 148, and a radio transmitter front-end 150.

As shown, the receiver and transmitter are each coupled to an antenna through an off-chip antenna interface 171 and a diplexer (duplexer) 177, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration. Also, the antenna structure of the wireless transceiver may depend on the particular standard(s) to which the wireless transceiver is compliant and the applications thereof.

In operation, the transmitter receives outbound data 162 that includes non-realtime data or real-time data from a host device, such as communication device 10 or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164 that includes an outbound symbol stream that contains outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation 168.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152 and optionally controls the configuration of the antenna in response to one or more control signals 141 generated by processing module 225.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156 that includes a inbound symbol stream. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160 that can include non-realtime data, realtime data an control data. The processing performed by the receiver processing module 144 can include, but is not limited to, digital intermediate frequency to baseband conversion, demodulation, demapping, depuncturing, decoding, and/or descrambling.

GPS receiver 187 includes an RF front-end 140' and down conversion module 142' that operate in a similar fashion to the modules described in conjunction with RF receiver 137, however, to receive and convert GPS RF signals 143 into a plurality of down converted GPS signals 159. Note that the GPS RF signals 143 may be one or more of: an L1 band at 1575.42 MHz, which includes a mix of navigation messages, coarse-acquisition (C/A) codes, and/or encryption precision P(Y) codes; an L2 band at 1227.60 MHz, which includes P(Y) codes and may also include an L2C code; and/or an L5 band at 1176.45 MHz. Further note that the GPS RF signals 143 can include an RF signal from a plurality of satellites (e.g., up to 20 different GPS satellites RF signals may be received). GPS processing module 144' operates on the down converted signal 159 to generate GPS data 163, such as GPS position data 212 and GPS data quality signal 216 and/or other GPS data.

Processing module 225 includes circuitry, software and/or firmware that generates motion data, such as motion data 113, position information 230 and/or velocity information 232, from motion parameters 161, such as motion vector 202 and GPS data 163, such as GPS position data 212. As previously described, processing module 225 optionally includes this motion data in outbound data 162 to be transmitted to a remote station such as access point 110, base station, telephone network, etc. In an embodiment of the present invention, the processing module 225 includes circuitry as described in conjunction with FIGS. 7 & 9 or other hardware, software or firmware.

In addition processing module 225 includes circuitry, software and/or firmware that generates control signals 141 from either the motion data or control data, such as control data 115, received in inbound data 160 from a remote station such as access point 110. In operation, processing module 225 generates control signals 141 to modify the transmit and/or receiver parameters of the RF transceiver 125 such as the protocol parameters or protocols used by receiver processing module 144 and transmitter processing module 146, antenna configurations used by antenna interface 171 to set the beam pattern, gain, polarization or other antenna configuration of the antenna, transmit power levels used by radio transmitter front-end 150 and receiver parameters, such as receiver sensitivity used by RF front-ends 140 and 140' of the RF receiver 137 and the GPS receiver 187.

In an embodiment of the present invention, processing module 225 includes a look-up table, software algorithm, or circuitry that generates the desired control signals 141 based on the particular motion data or control data. In this fashion, the processing module 225 can operate adjust a receive parameter based on the receive control signal, such as a receiver sensitivity, a protocol selection, a data rate, a packet length, a data payload length, a coding parameter, a contention period, and/or a back-off parameter. Further, the processing module can operate to modify an in-air beamforming phase, a diversity antenna selection, an antenna gain, a polarization antenna selection, a multi-input multi-output (MIMO) antenna structure, and/or a single-input single-output (SISO) antenna structure of the antenna 171. In addition, the processing module 225 can operate to adjust a transmit parameter such as a transmit power, a protocol selection, a data rate, a packet length, a data payload length, a coding parameter, a contention period, and a back-off parameter.

In addition, processing module 225 can optionally access a look-up table, algorithm, database or other data structure that includes a list or data sufficient to define one or more restricted areas where either the operation of the communication device 10, 30, 30' or 125 is prohibited or the communication device 10, 30, 30' or 125 is not permitted to transmit. The restricted areas could correspond to hospitals, airplanes in the air, security areas or other restricted areas. When the position information corresponds to one of these restricted areas, the RF transceiver 137 or just the RF transmitter 127 could be disabled by processing module 225 via one or more control lines 141 in accordance with the corresponding restriction in place for this particular restricted area.

In an embodiment of the present invention, receiver processing module 144, GPS processing module 144' and transmitter processing module 146 can be implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the these processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

While the processing module 144, GPS processing module 144', transmitter processing module 146, and processing module 225 are shown separately, it should be understood that these elements could be implemented separately, together through the operation of one or more shared processing devices or in combination of separate and shared processing.

FIG. 11 is a schematic block diagram of an embodiment of RF transceiver 135' and with dual mode receiver 137' in accordance with the present invention. In particular, RF transceiver 135' includes many similar elements of RF transceiver 135 that are referred to by common reference numerals. However, RF receiver 137' operates as a dual mode device, combining the functionality of RF receiver 137 and GPS receiver 187 to produce inbound data/GPS data 160" as either inbound data 160 (in a first mode) or GPS data 163 (in a second mode). In this fashion, RF front end 140" and down conversion module 142" can be configured based one of the control signals 141 to operate as either RF front end 140 and down conversion module 142 to receive and down convert inbound RF signal 153 or as RF front end 140' and down conversion module 142' to receive and convert inbound GPS signal 143 as described in conjunction with FIG. 10.

In addition receiver processing module 144" further includes the functionality of receiver processing module 144 and additional GPS processing functionality of GPS processing module 144' to similarly operate based on the selected mode of operation.

FIG. 12 is a side view of a pictorial representation of an integrated circuit package in accordance with an embodiment of the present invention. RF IC 330, such as RF IC 50 or 70, includes a gyrator die 314 with a gyrating circuit such as on-chip gyrator 175 gyrator and an RF system on a chip (SoC) die 312 that includes the remaining elements of RF IC 50, 70 or 70', a substrate 306, and bonding pads 318. This figure is not drawn to scale, rather it is meant to be a pictorial representation that illustrates the juxtaposition of the RF SoC die 312, gyrator die 314 and the substrate 306. RF SoC die 312 and gyrator die are coupled to one another and to respective ones of the bonding pads 318 using bonding wires, bonding pads and/or by other connections.

FIG. 13 is a side view of a pictorial representation of an integrated circuit package in accordance with an embodiment of the present invention. RF IC 332 is similar to the configuration described in conjunction with FIG. 12 is presented with similar elements referred to by common reference numerals. In particular, alternate stacked configuration is shown that stacks gyrator die 314 on top of RF SoC die 312. In this configuration, RF SoC die 312 and gyrator die 314 can be coupled to one another using bonding wires, bonding pads, conductive vias and/or by other connections. This figure is also not drawn to scale.

FIG. 14 is a side view of a pictorial representation of an integrated circuit package in accordance with an embodiment of the present invention. RF IC 334 is similar to the configuration described in conjunction with FIGS. 12 and 13 with similar elements referred to by common reference numerals. In this particular configuration, on-chip gyrator 175 is included on RF SoC die 316 that includes the remaining components or RF IC 50, 70 or 70'. This figure is also not drawn to scale.

FIG. 15 is a side view of a pictorial representation of an integrated circuit package in accordance with the present invention. RF IC 325, such as RF IC 50, 70 or 70', includes a system on a chip (SoC) die 300, a memory die 302 a substrate 306, bonding pads 308 and gyrator 304, such as on-chip gyrating circuit 175. This figure is not drawn to scale. In particular, the RF IC 325 is integrated in a package with a top and a bottom having a plurality of bonding pads 308 to connect the RF IC 325 to a circuit board, and wherein the on-chip gyrator 304 is integrated along the bottom of the package. In an embodiment of the present invention, die 302 includes an on-chip memory and die 300 includes the processing module 225 and the remaining elements of RF IC 50, 70 or 70'. These dies are stacked and die bonding is employed to connect these two circuits and minimize the number of bonding pads, (balls) out to the package. Both SoC die 300 and memory die 302 are coupled to respective ones of the bonding pads 308 via bonding wires or other connections.

Gyrator 304 is coupled to the SoC die 300, and/or the memory die 302 via conductive vias, bonding wires, bonding pads or by other connections. The positioning of the Gyrator on the bottom of the package in a flip chip configuration allows good heat dissipation of the gyrator 304 to a circuit board when the RF integrated circuit is installed.

FIG. 16 is a bottom view of a pictorial representation of an integrated circuit package in accordance with the present invention. As shown, the bonding pads (balls) 308 are arrayed in an area of the bottom of the integrated circuit with an open center portion 310 and wherein the on-chip gyrator 304 is integrated in the open center portion. While a particular pattern and number of bonding pads 308 are shown, a greater or lesser number of bonding pads can likewise be employed with alternative configurations within the broad scope of the present invention.

While RF ICs 325, 330, 332 and 334 provide several possible implementations of RF ICs in accordance with the present invention, other circuits including other integrated circuit packages can be implemented including other stacked, in-line, surface mount and flip chip configurations.

FIG. 17 is a flow chart of an embodiment of a method in accordance with the present invention. In particular, a method is presented for use in conjunction with one or more of the functions and features described in conjunction with FIGS. 1-16. In step 400, a motion parameter is generated based on motion of the device using an on-chip gyrating circuit and/or a GPS receiver. In step 402, the motion parameter is processed to produce motion data. In step 404, outbound data is generated that includes the motion data. In step 406, an outbound RF signal is generated from outbound data. In step 408, the outbound RF signal is transmitted to a remote station.

In an embodiment of the present invention, the motion data includes an indication that a device is a mobile device, position information, velocity information, and/or an acceleration. Step 404 can insert motion data in the outbound data periodically.

FIG. 18 is a flow chart of an embodiment of a method in accordance with the present invention. In particular a method is presented for use in conjunction with the method of FIG. 17. In addition, step 500 is included for comparing current motion data to past motion data. In step 502, the method detects when the difference between the current motion data and past the motion data compares unfavorably to a motion change threshold. If so, step 404 includes motion data in the outbound data.

FIG. 19 is a flow chart of an embodiment of a method in accordance with the present invention; and In particular a method is presented for use in conjunction with the method of FIG. 17. In addition, step 510 is included for generating inbound data from an inbound RF signal received from the remote station. Further, step 404 includes motion data in the outbound data in response to a request for the motion data included in the inbound data.

FIG. 20 is a flow chart of an embodiment of a method in accordance with the present invention. In particular a method is presented for use in conjunction with the method of FIGS. 17-19. In addition, step 520 is included for generating inbound data from an inbound RF signal received from remote station, wherein the inbound data includes control data that is determined by the access point based on the motion data. In addition, the method includes step 522 for modifying a transmit parameter and/or receive parameter of an RF transceiver in response to the control data.

FIG. 21 is a flow chart of an embodiment of a method in accordance with the present invention. In particular a method is presented that can be used with the other functions and features of the present invention described in conjunction with FIGS. 1-20. In step 530, motion data is generated from a GPS receiver and/or a gyrating circuit. This data can include position information, velocity information and/or acceleration. In step 532, transmit and/or receive parameters including protocol parameters and antenna configurations of an RF transceiver are modified in response to the motion data.

FIG. 22 is a flow chart of an embodiment of a method in accordance with the present invention. In particular a method is presented that can be used with the other functions and features of the present invention described in conjunction with FIGS. 1-21. In step 630, control data is received from a remote station, such as control data 115 received from an access point 110. In step 632, transmit and/or receive parameters including protocol parameters and antenna configurations of an RF transceiver are modified in response to the motion data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A circuit comprising:
   an on-chip gyrating circuit that generates a motion parameter based on motion of the circuit;
   a global positioning system (GPS) receiver that receives a GPS signal and that generates GPS position data based on the GPS signal;
   a processing module coupled to:
   process the motion parameter to produce motion data;
   generate position information based on at least one of the GPS position data and the motion data;
   generate velocity information based on at least one of: the motion data and the GPS position data:
   generate at least one transceiver control signal based on the velocity information, wherein the at least one transceiver control signal includes a transmit control signal;
   convert outbound data into an outbound symbol stream; and convert an inbound symbol stream into inbound data; and a wireless local area network (WLAN) transceiver section that is controlled based on the at least one transceiver control signal to:
   generate an outbound RF signal from the outbound symbol stream;
   convert an inbound RF signal into the inbound symbol stream; and
   adjust a transmit parameter based on the transmit control signal, wherein the transmit parameter includes at least one of a transmit power, a protocol selection, a data rate, a packet length, a data payload length, a coding parameter, a contention period, and a back-off parameter.

2. The circuit of claim 1 wherein the processing module adjusts a receiver parameter of the GPS receiver based on the motion data.

3. The circuit of claim 1 wherein the at least one transceiver control signal includes a receive control signal, wherein the wireless local area network transceiver is further operable to adjust a receive parameter based on the receive control signal, and wherein the receive parameter includes at least one of a receiver sensitivity, a protocol selection, a data rate, a packet length, a data payload length, a coding parameter, a contention period, and a back-off parameter.

4. The circuit of claim 1 wherein the at least one transceiver control signal includes an antenna control signal and wherein the antenna control signal is coupled to an antenna to modify at least one of, an in-air beamforming phase, a diversity antenna selection, an antenna gain, a polarization antenna selection, a multi-input multi-output (MIMO) antenna structure, and a single-input single-output (SISO) antenna structure.

5. The circuit of claim 1 wherein the GPS receiver generates a GPS data indication that indicates a GPS data quality, wherein the processing module generates the position information based on estimated position data when the GPS data indication compares unfavorably to a first value and generates the position information based on the GPS position data when the GPS data indication compares favorably to the first value.

6. The circuit of claim 1 wherein the motion data includes a motion vector, wherein the processing module generates velocity information based on the motion vector when the GPS data indication compares unfavorably to a first value, and generates velocity information based on the GPS position data when the GPS data indication compares favorably to the first value.

7. The circuit of claim 1 wherein the wireless local area network transceiver includes position information in the outbound data and receives inbound data generated based on the position information, that includes transceiver control data.

8. The circuit of claim 7 wherein the processing module further generates a receive control signal in accordance with the transceiver control data, wherein the wireless local area network transceiver is further operable to adjust a receive parameter based on the receive control signal, and wherein the receive parameter includes at least one of a receiver sensitivity, a protocol selection, multi-input multi-output (MIMO) coefficients, a data rate, a packet length, a data payload length, a coding parameter, a contention period, and a back-off parameter.

9. The circuit of claim 7 wherein the processing module further generates an antenna control signal in accordance with the transceiver control data, wherein the antenna control signal is coupled to an antenna to modify at least one of, an in-air beamforming phase, a diversity antenna selection, an antenna gain, a polarization antenna selection, a multi-input multi-output (MIMO) antenna structure, and a single-input single-output (SISO) antenna structure.

10. The circuit of claim 7 wherein the processing module further generates a transmit control signal in accordance with the transceiver control data, wherein the wireless local area network transceiver is further operable to adjust a transmit parameter based on the transmit control signal, and wherein the transmit parameter includes at least one of a transmit power, a protocol selection, a data rate, a packet length, a data payload length, a coding parameter, a contention period, and a back-off parameter.

11. An integrated circuit (IC) comprising:
   an on-chip gyrating circuit that generates a motion parameter based on motion of the IC, wherein the on-chip gyrating circuit is implemented with microelectromechanical systems (MEMS) technology;
   a global positioning system (GPS) receiver that receives a GPS signal and that generates GPS position data based on the GPS signal;
   a processing module, coupled to the on-chip gyrating circuit and the GPS receiver, that processes the motion parameter to produce motion data and that generates position information based on the GPS position data and the motion data; and
   a wireless local area network transceiver, coupled to the processing module, that generates an outbound RF signal that includes outbound data and that generates inbound data from an inbound RF signal
   wherein the IC is integrated in a package having a substrate, a first die and a second die and wherein the GPS transceiver and wireless local area network transceiver are implemented on the first die and the on-chip gyrating circuit is implemented on the second die.

12. The IC of claim 11 wherein the on-chip gyrating circuit includes one of:
   a piezoelectric gyroscope;
   a vibrating wheel gyroscope;
   a tuning fork gyroscope;
   a hemispherical resonator gyroscope; and
   a rotating wheel gyroscope.

13. A wireless communication device comprises:
   an integrated circuit (IC) that includes:
      a package substrate that supports an on-chip gyrating circuit that generates the motion parameter based on motion of the wireless communication device, and wherein the package substrate further supports a die that supports:
         a GPS receiver that receives a GPS signal and that generates GPS position data based on the GPS signal;
         a processing module, coupled to the on-chip gyrating circuit and the GPS transceiver, that processes the motion parameter to produce motion data and that generates position information based on the GPS position data and the motion data; and
         a wireless local area network transceiver that generates an outbound RF signal that includes outbound data and that generates voice inbound data from an inbound RF signal; and
      an antenna structure coupled to receive the inbound RF signal and to transmit the outbound RF signal.

14. The circuit of claim 13 wherein the processing module further generates a receive control signal in accordance with the motion data, and wherein the wireless local area network transceiver is further operable to adjust a receive parameter based on the receive control signal.

15. The circuit of claim 14 wherein the receive parameter includes at least one of a receiver sensitivity, a protocol selection, a data rate, a packet length, a data payload length, a coding parameter, a contention period, and a back-off parameter.

16. The circuit of claim 13 wherein the processing module further generates an antenna control signal in accordance with the motion data.

17. The circuit of claim 16 wherein the antenna control signal is coupled to an antenna to modify at least one of, an in-air beamforming phase, a diversity antenna selection, an antenna gain, a polarization antenna selection, a multi-input multi-output (MIMO) antenna structure, and a single-input single-output (SISO) antenna structure.

18. The circuit of claim 13 wherein the processing module further generates a transmit control signal in accordance with the motion data and wherein the wireless local area network transceiver is further operable to adjust a transmit parameter based on the transmit control signal.

19. The circuit of claim 18 wherein the transmit parameter includes at least one of a transmit power, a protocol selection, a data rate, a packet length, a data payload length, a coding parameter, a contention period, and a back-off parameter.

20. The circuit of claim 13 wherein the wireless local area network transceiver includes position information in the outbound data and receives inbound data from an access point that includes control data.

21. The circuit of claim 20 wherein the processing module further generates a receive control signal in accordance with the control data and wherein the wireless local area network transceiver is further operable to adjust a receiver parameter based on the receive control signal.

22. The circuit of claim 21 wherein the receive parameter includes at least one of a receiver sensitivity, a protocol selection, a data rate, a packet length, a data payload length, a coding parameter, a contention period, and a back-off parameter.

23. The circuit of claim 20 wherein the processing module further generates an antenna control signal in accordance with the control data and wherein the antenna control signal is coupled to an antenna to modify at least one of, an in-air beamforming phase, a diversity antenna selection, an antenna gain, a polarization antenna selection, a multi-input multi-output (MIMO) antenna structure, and a single-input single-output (SISO) antenna structure.

24. The circuit of claim 20 wherein the processing module further generates a transmit control signal in accordance with the control data and wherein the wireless local area network transceiver is further operable to adjust a transmit parameter based on the transmit control signal.

25. The circuit of claim 24 wherein the transmit parameter includes at least one of a transmit power, a protocol selection, a data rate, a packet length, a data payload length, a coding parameter, a contention period, and a back-off parameter.

\* \* \* \* \*